US007016122B2

(12) United States Patent
Okawara

(10) Patent No.: US 7,016,122 B2
(45) Date of Patent: Mar. 21, 2006

(54) IMAGING APPARATUS

(75) Inventor: Hiroto Okawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 10/931,531

(22) Filed: Sep. 1, 2004

(65) Prior Publication Data

US 2005/0046966 A1 Mar. 3, 2005

(30) Foreign Application Priority Data

Sep. 2, 2003 (JP) ............................ 2003-310790

(51) Int. Cl.

| | |
|---|---|
| ***G02B 15/14*** | (2006.01) |
| ***G03B 7/00*** | (2006.01) |
| ***G03B 17/00*** | (2006.01) |
| ***H04N 5/232*** | (2006.01) |
| ***H04N 5/228*** | (2006.01) |

(52) U.S. Cl. ...................... 359/696; 359/697; 359/698; 396/65; 396/79; 396/80; 396/81; 396/87; 396/133; 348/345; 348/347; 348/360; 348/208.12; 348/240.2

(58) Field of Classification Search ........ 359/694–699; 396/65, 75, 80, 81, 82, 87, 104, 125, 133, 396/135; 348/345, 347, 348, 360, 208.12, 348/240.2

See application file for complete search history.

(56) References Cited

U.S. PATENT DOCUMENTS

| | | | | |
|---|---|---|---|---|
| 5,005,956 | A | 4/1991 | Kaneda et al. | |
| 5,067,802 | A * | 11/1991 | Orino | 359/700 |
| 5,144,491 | A * | 9/1992 | Ushiro et al. | 359/697 |
| 5,146,071 | A * | 9/1992 | Ookubo et al. | 250/201.2 |
| 5,200,860 | A * | 4/1993 | Hirasawa et al. | 359/696 |
| 5,202,717 | A * | 4/1993 | Ookubo et al. | 396/81 |
| 5,438,190 | A * | 8/1995 | Kaneda et al. | 250/201.3 |
| 5,455,649 | A * | 10/1995 | Yamada et al. | 396/87 |
| 5,949,586 | A * | 9/1999 | Hirasawa et al. | 359/698 |
| 6,683,652 | B1 * | 1/2004 | Ohkawara et al. | 348/347 |
| 6,954,589 | B1 * | 10/2005 | Okawara | 396/87 |
| 2005/0046711 | A1 * | 3/2005 | Morimoto | 348/240.2 |

* cited by examiner

*Primary Examiner*—Loha Ben
(74) *Attorney, Agent, or Firm*—Canon U.S.A. Inc. I.P. Div

(57) ABSTRACT

A lens-controlling device controls a first lens unit which moves for zooming and a second lens unit which moves for correcting the displacement of an image plane caused by zooming and for focusing. The lens-controlling device includes a memory which stores data for obtaining target-position information representing a target position to which the second lens unit is to be moved, the target position corresponding to a position to which the first lens unit is moved from a current position and a controller which generates the target-position information on the basis of the data and controls the movement of the second lens unit on the basis of position information of the first lens unit and the target-position information.

10 Claims, 17 Drawing Sheets

$$a_x = a_k - \frac{(Z_k - Z_{k-1})(a_k - a_{k-1})}{(Z_k - Z_{k-1})}$$

$$b_x = b_k - \frac{(Z_k - Z_{k-1})(b_k - b_{k-1})}{(Z_k - Z_{k-1})}$$

FIG. 14

∞ ← FOCUS POSITION → CLOSE-UP

W ↑ ZOOM POSITION ↓ T

| | | n | | | | | | | |
|---|---|---|---|---|---|---|---|---|---|
| | | 0 | 1 | 2 | 3 | --- | k | --- | m |
| V | 0 | $A_{00}$ | $A_{10}$ | $A_{20}$ | $A_{30}$ | --- | $A_{k0}$ | --- | $A_{m0}$ |
| | 1 | $A_{01}$ | $A_{11}$ | $A_{21}$ | $A_{31}$ | --- | $A_{k1}$ | --- | $A_{m1}$ |
| | 2 | $A_{02}$ | $A_{12}$ | $A_{22}$ | $A_{32}$ | --- | $A_{k2}$ | --- | $A_{m2}$ |
| | 3 | $A_{03}$ | $A_{13}$ | $A_{23}$ | $A_{33}$ | --- | $A_{k3}$ | --- | $A_{m3}$ |
| | ⋮ | ⋮ | ⋮ | ⋮ | ⋮ | ⋮ | --- | ⋮ | --- | ⋮ |
| | k | $A_{0k}$ | $A_{1k}$ | $A_{2k}$ | $A_{3k}$ | --- | $A_{kk}$ | --- | $A_{mk}$ |
| | ⋮ | ⋮ | ⋮ | ⋮ | ⋮ | ⋮ | --- | ⋮ | --- | ⋮ |
| | s | $A_{0s}$ | $A_{1s}$ | $A_{2s}$ | $A_{3s}$ | --- | $A_{ks}$ | --- | $A_{ms}$ |

OBJECT DISTANCE $L = \frac{B \cdot f}{X}$

IMAGING APPARATUS

CROSS REFERENCE TO RELATED APPLICATIONS

This application claims priority from Japanese Patent Application No. 2003-310790 filed Sep. 2, 2003, which is hereby incorporated by reference herein.

BACKGROUND OF THE INVENTION

1. Field of the Invention

The present invention relates to an imaging apparatus which receives light.

2. Description of the Related Art

Cameras with built-in lenses are required to be smaller, and to record an image of an object at a position as close as possible to the camera. Accordingly, instead of mechanically moving a correcting lens and a variator lens in association with each other with a cam, a so-called inner-focus system is commonly used. In this system, the correcting lens is moved on the basis of lens cam data stored in a microcomputer in advance and representing trajectories of the correcting lens, and focusing is performed using the correcting lens.

FIG. 10 is a diagram showing the structure of a known inner-focus lens system. With reference to the figure, the system includes a fixed front lens 901, a zoom lens (also called a variator lens) 902 used for zooming (first lens unit), a diaphragm 903, a fixed lens 904, a focusing lens 905 (second lens unit) which serves as a correcting lens having a focus adjustment function and a function of correcting the displacement of an image plane caused by zooming (a so-called compensating function), and an imaging surface 906.

In the lens system shown in FIG. 10, the focusing lens 905 serves both the compensating function and the focus adjustment function. Therefore, even when the focal length is constant, the position of the focusing lens 905 for focusing on the imaging surface 906 varies depending the object distance. FIG. 11 is a graph obtained by plotting the position of the focusing lens 905 for focusing the object image on the imaging surface 906 versus focal length for different object distances. When zooming is performed, a trajectory corresponding to the object distance is selected from a plurality of trajectories shown in FIG. 11, and the focusing lens 905 is moved along the selected trajectory. Accordingly, the focused state is maintained during zooming.

In a lens system in which focusing is performed using a front lens, a focusing lens is provided separately from a zoom lens and the zoom lens and the focusing lens are mechanically connected to a cam ring. Accordingly, when the focal length is changed by manually rotating the cam ring, the lenses are reliably moved by the cam ring no matter how fast the cam ring is rotated. Since the zoom lens and the focusing lens move along an optical axis while sliding along cams formed on the cam ring, image blurring due to zooming does not occur as long as the focusing lens is at an in-focus position.

In comparison, in the above-described inner-focus lens system, information of the trajectories shown in FIG. 11 or information corresponding thereto (information representing the trajectories or functions taking lens position as a parameter) is stored in advance, and zooming is performed by moving the focusing lens along a trajectory selected from among the trajectories on the basis of the positions of the focusing lens and the zoom lens.

As is clear from FIG. 11, when the zoom lens is moved in the direction from telephoto to wide angle, the focused state can be maintained using the above-described trajectory tracing method since the trajectories converge toward the wide-angle end. However, when the zoom lens is moved in the direction from wide angle to telephoto, the trajectory to be traced by the focusing lens cannot be determined if the focusing lens is at a position where the trajectories converge, and therefore the focused state cannot be maintained by the above-described trajectory tracing method.

Accordingly, Japanese Patent No. 2795439 discloses a control method in which the focusing lens is repeatedly moved in a direction causing the image to go out of focus and then in a direction to adjust the focus on the basis of the information representing the focus state (in other words, the moving speed is varied) when the zoom lens is being moved for zooming. In addition, a method for increasing the accuracy of selecting the trajectory to be traced is also disclosed in Japanese Patent No. 2795439 (FIGS. 3 and 4). According to this method, the period of variation in a sharpness signal is varied by changing the amount of variation in a tracing speed depending on the object distance, the focal length, and the depth of field.

In the above-described control method for the zooming operation, focus detection is performed by a TV-AF method using a video signal from an imaging device. Therefore, processes are normally performed in synchronization with a vertical synchronizing signal.

On the other hand, as is clear from FIG. 11, when zooming is performed using the inner-focus lens system, the cam trajectories to be traced by the focusing lens are on substantially the same point at the wide-angle end for object distances in the range of several tens of centimeters to infinity. Therefore, when the TV-AF method is used, the cam trajectory to be traced cannot be selected accurately unless the zoom lens is moved to an area near the telephoto end.

In TV-AF, a signal detection period at which an AF evaluation value is obtained is equal to the period of the vertical synchronizing signal. Accordingly, as the zoom speed increases, the accuracy of determining the trajectory to be traced is degraded. Therefore, although actuators for focusing and zooming have recently been improved and made smaller, and inexpensive super-high-speed actuators have been developed, the potential of such actuators cannot be sufficiently exploited when the inner-focus lens system and the TV-AF method are used in combination, and hence, there is a limit to the zoom speed. Although high-speed zooming using super-high-speed actuators can be performed when the angle of view is adjusted in the standby mode, the zoom speed must be reduced in the recording mode in order to prevent image blurring.

In addition, when long-time exposure (recording), such as so-called slow shutter, is performed, the detection period of the AF evaluation value becomes equal to the exposure period, and the tracing accuracy is degraded even when the zoom speed is not high. Therefore, image blurring may occur when the trajectory is being determined and a long time is required for correcting the image blurring if zooming and panning are performed simultaneously. As a result, the imaging performance is degraded.

In addition, also when the contrast of the object is low or when the signal-to-noise (S/N) ratio is low due to low illumination, in the zooming operation, an accurate AF evaluation value cannot be accurately detected by the TV-AF method. Therefore, the trajectory-tracing performance is also degraded in these cases.

SUMMARY OF THE INVENTION

An object of the present invention is to provide a lens-controlling device, an optical apparatus, and a lens-controlling method with which high-quality zooming can be performed irrespective of the shooting scene and camerawork while reliably maintaining a focused state, even when the zoom speed is high.

In order to attain the above-described object, according to the present invention, a lens-controlling device for controlling a first lens unit which moves for zooming and a second lens unit which moves for focusing, the lens-controlling device includes a memory which stores data for obtaining target-position information representing a target position to which the second lens unit is to be moved, the target position corresponding to a position to which the first lens unit is moved from a current position; a controller which generates the target-position information on the basis of the data stored in the memory and controls the movement of the second lens unit on the basis of position information of the first lens unit and the target-position information; and a detector which detects a distance to an object to be focused on. The controller selects data items to be used from the data stored in the memory on the basis of a detection result obtained by the detector.

Further objects, features and advantages of the present invention will become apparent from the following description of the preferred embodiments with reference to the attached drawings.

BRIEF DESCRIPTION OF THE DRAWINGS

FIG. 14 is a diagram showing an example of a data table of the in-focus trajectories.

DESCRIPTION OF THE PREFERRED EMBODIMENTS

Embodiments of the present invention will be described below with reference to the accompanying drawings.

Technical Premise

Before describing the embodiments of the present invention, the technical premise of the present invention will be explained.

Figure 12:
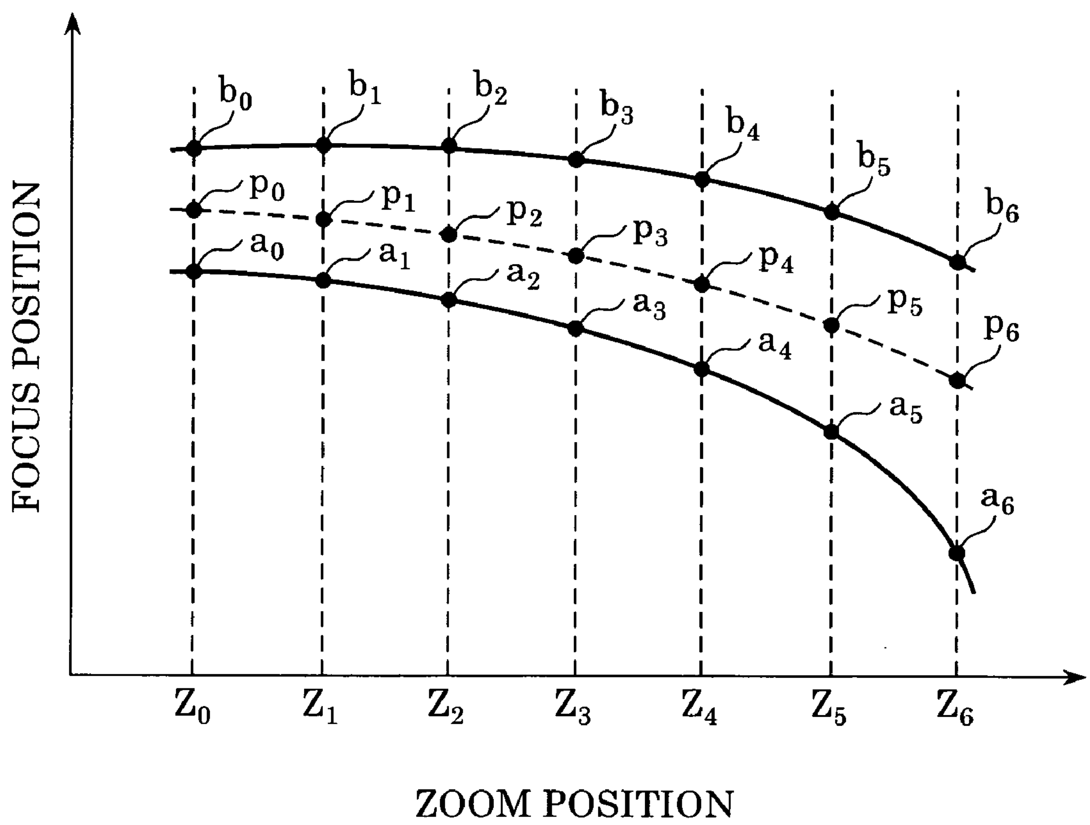
FIG. 12 is a diagram for explaining the in-focus trajectories.

FIG. 12 is a diagram for explaining an example of a trajectory-tracing method of a focusing lens. In FIG. 12, $Z_0$, $Z_1$, $Z_2$, . . . , $Z_6$ are positions of a zoom lens. In addition, $a_0$, $a_1$, $a_2$, . . . , $a_6$ and $b_0$, $b_1$, $b_2$, . . . , $b_6$ are positions of the focusing lens for different object distances, and these positions are stored in a microcomputer (not shown) in advance. Each group of focusing-lens positions ($a_0$, $a_1$, $a_2$, . . . , $a_6$ and $b_0$, $b_1$, $b_2$, . . . , $b_6$) defines an in-focus trajectory for a representative object distance (representative trajectory) which is to be traced by the focusing lens.

In addition, $p_0$, $p_1$, $p_2$, . . . , $p_6$ are positions on an in-focus trajectory which is calculated on the basis of the two representative trajectories and which is to be actually traced by the focusing lens. The positions $p_0$, $p_1$, $p_2$, . . . $p_6$ on this in-focus trajectory are calculated as follows:

$$p_{(n+1)}=|p_{(n)}-a_{(n)}|/|b_{(n)}-a_{(n)}|\times|b_{(n+1)}-a_{(n+1)}|+a_{(n+1)} \quad (1)$$

According to Equation (1), when the focusing lens is at p0 in FIG. 12, an internal ratio at which p0 divides line b0−a0 is determined first, and then p1 is determined as the point which divides line b1−a1 at the determined internal ratio. The moving speed of the focusing lens for maintaining the focused state is determined from the displacement p1−p0 and the time required for the zoom lens to move from Z0 to Z1.

Figure 13:
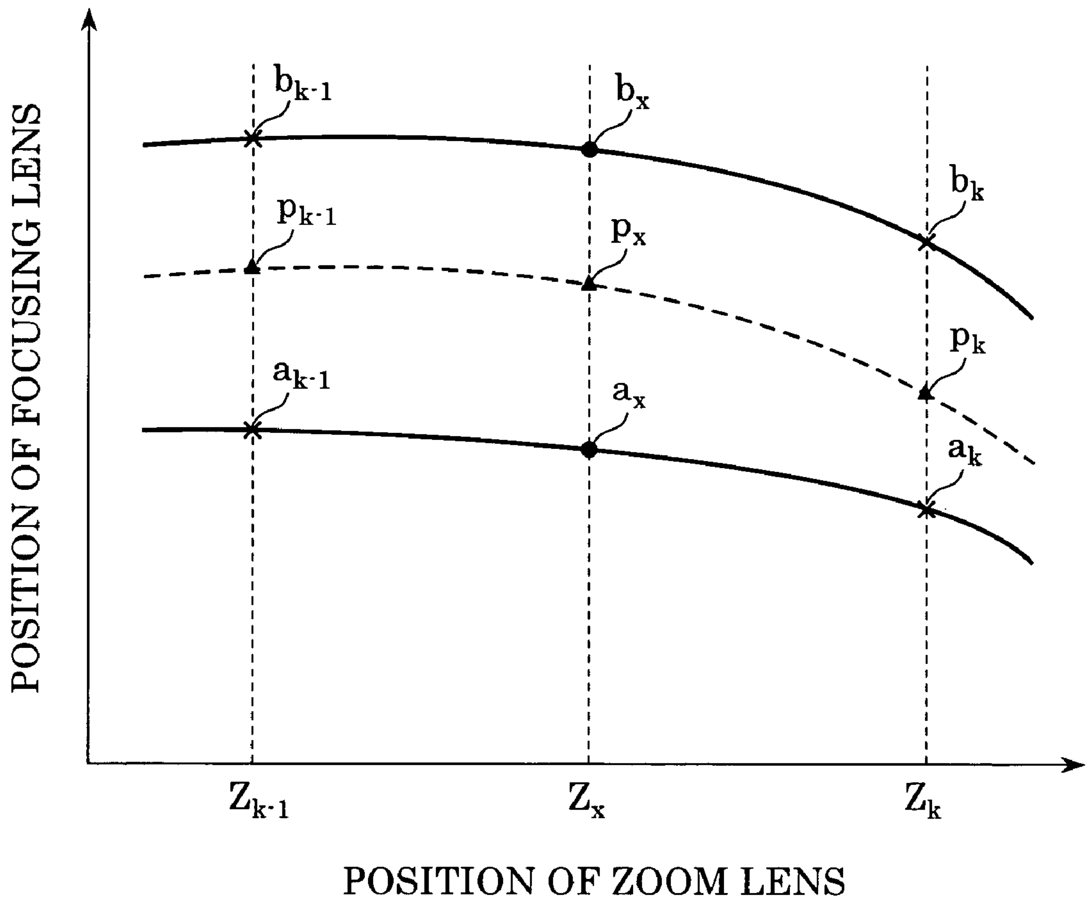
FIG. 13 is a diagram for explaining a method for interpolating the moving direction of a zoom lens.

Next, the case is considered in which the position where the zoom lens stops is not limited to the positions on the boundaries between zoom areas defined in the representative-trajectory data stored in advance. FIG. 13 is a diagram for explaining a method for interpolating the moving direction of the zoom lens. In this figure, a portion of FIG. 12 is extracted and the position of the zoom lens is arbitrary.

In FIG. 13, the vertical axis shows the position of the focusing lens, and the horizontal axis shows the position of the zoom lens. It is assumed that when the positions of the zoom lens are Z0, Z1, . . . , Zk−1, Zk, . . . , Zn, the respective focusing-lens positions on the representative trajectories stored in the microcomputer for different object distances are given as a0, a1, . . . , ak−1, ak . . . , an, and b0, b1, . . . , bk−1, bk . . . , bn.

When the zoom lens is at Zx, which is not on any of the boundaries between the zoom areas, and the focusing lens is at px, ax and bx are calculated as follows:

$$a_x=a_k-(Z_k-Z_x)\times(a_k-a_{k-1})/(Z_k-Z_k-1) \quad (2)$$

$$b_x=b_k-(Z_k-Z_x)\times(b_k-b_{k-1})/(Z_k-Z_{k-1}) \quad (3)$$

Thus, ax and bx are calculated using the internal ratio obtained from the current zoom-lens position and two boundary positions on both sides thereof (Zk and Zk−1 in FIG. 13) and four representative-trajectory data items stored in advance (ak, ak−1, bk, and bk−1 in FIG. 13). More specifically, ax and bk are determined as points that divide lines ak−1−ak and bk−1−bk, respectively, at the above-described internal ratio.

Then, pk and pk−1 are calculated from Equation (1) using the above-described four representative-trajectory data items as points that divide lines bk−ak and bk−1−ak−1, respectively, at the internal ratio obtained from ax, px, and bx.

When zooming from wide angle to telephoto, the moving speed of the focusing lens for maintaining the focused state is determined from the time required for the zoom lens to move from Zx to Zk and the distance between the current focusing-lens position px and the target position pk to which the focusing lens must be moved.

When zooming from telephoto to wide angle, the moving speed of the focusing lens for maintaining the focused state is determined from the time required for the zoom lens to move from Zx to Zk−1 and the distance between the current focusing-lens position px and the target position pk−1 to which the focusing lens must be moved.

An example of a data table of in-focus trajectory information stored in advance in the microcomputer is shown in FIG. 14. The data table shown in FIG. 14 includes focusing-lens position data A(n, v), which varies depending on the zoom-lens position and the object distance. The parameter n for the columns represents the object distance and the parameter v for the rows represents the zoom-lens position (focal length). In the data table, n=0 corresponds to the infinite object distance, and the object distance is reduced toward the close-up end as n increases. The object distance is 1 cm when n=m.

In addition, v=0 corresponds to the wide-angle end, and the focal length increases as v increases. The zoom lens is at the telephoto end when v=s. Accordingly, each column in the data table defines a single representative trajectory.

Next, a trajectory-tracing method for solving the above-described problem, that is, the inability to accurately determine the trajectory to be traced by the focusing lens in the zooming operation from wide angle to telephoto, will be described below.

Figure 15A:
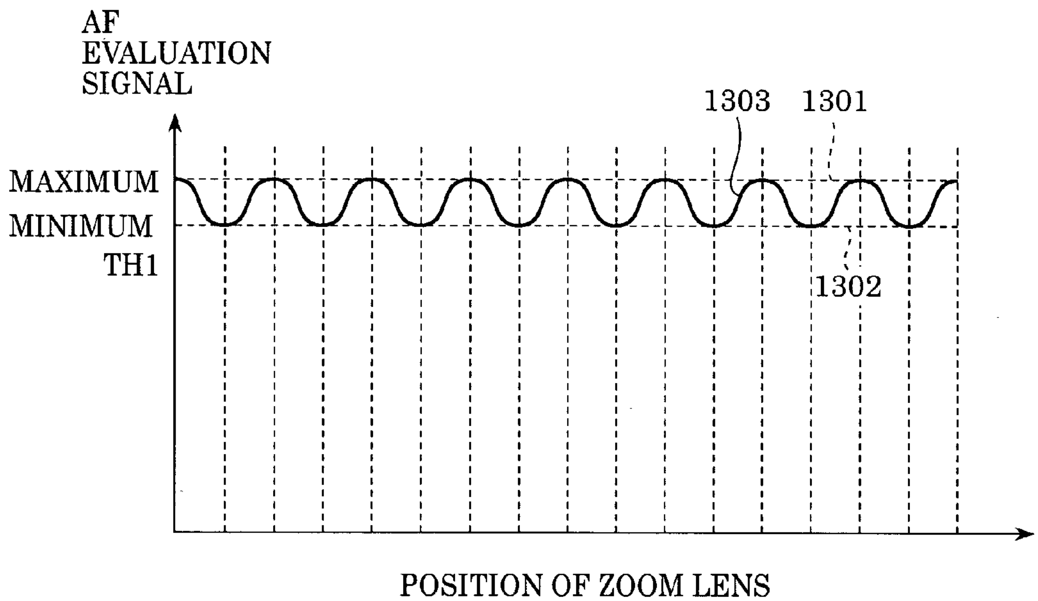
FIGS. 15A and 15B are diagrams showing the technical premise of the present invention.
Figure 15B:
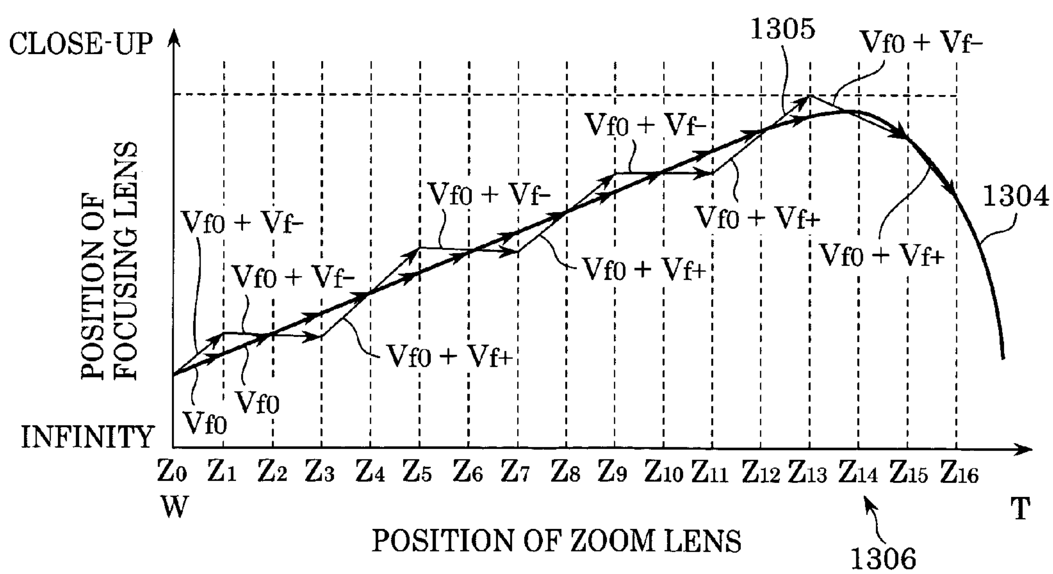

In FIGS. 15A and 15B, the horizontal axis shows the position of the zoom lens. In addition, in FIG. 15A, the vertical axis shows an AF evaluation signal obtained from an image signal by a TV-AF method. The AF evaluation signal represents the level of a high-frequency component (sharpness signal) in the image signal. In FIG. 15B, the vertical axis shows the position of the focusing lens. In FIG. 15B, reference numeral 1304 denotes a desired trajectory (collection of target positions) along which the focusing lens is to be moved during zooming while focusing on an object positioned at a predetermined distance.

When the zoom lens is in a region closer to the wide-angle end than the position denoted by 1306 (Z14) and the focusing lens moves toward the close-up end, the sign of a standard moving speed for the in-focus trajectory tracing is defined as positive. In addition, when the zoom lens is in a region closer to the telephoto end than the position 1306 and the focusing lens moves toward the infinity end, the sign of the standard moving speed for the in-focus trajectory tracing is defined as negative. If the focusing lens moves along the desired trajectory 1304 while maintaining the focused state, the level of the AF evaluation signal is maintained at the level denoted by 1301 in FIG. 15A. Generally, the AF evaluation signal level is maintained substantially constant during zooming if the focused state is maintained.

In FIG. 15B, the standard moving speed of the focusing lens which traces the desired trajectory 1304 during zooming is defined as Vf0. If the actual moving speed of the focusing lens is defines as Vf and is varied above and below the standard moving speed Vf0 during zooming, the actual trajectory is shaped like a zigzag line, as denoted by 1305 (hereafter called zigzag movement).

In such a case, the AF evaluation signal level varies between maximum and minimum values, as denoted by 1303 in FIG. 15A. The AF evaluation signal level 1303 reaches the maximum level 1301 at positions where the desired trajectory 1304 and the actual zigzag trajectory 1305 intersect (that is, positions with even numbers among Z0, Z1, Z2, . . . , Z16). In addition, the AF evaluation signal level 1303 is reduced to the minimum level 1302 at positions where a moving-direction vector of the actual trajectory 1305 is changed (that is, positions with odd numbers among Z0, Z1, Z2, . . . , Z16).

Therefore, when considering the case in which the minimum level 1302 of the AF evaluation signal level 1303 is set to TH1 in advance (that is, if an allowable range of the AF evaluation signal level for ensuring the focused state is defined by setting the lower limit TH1) and the moving-direction vector of the trajectory 1305 is switched each time the AF evaluation signal level 1303 is reduced to TH1, the focusing lens is caused to approach the desired trajectory 1304 each time the moving-direction vector is switched. More specifically, each time the image blurs to an extent corresponding to the difference between the maximum level 1301 and the minimum level 1302 (TH1) of the AF evaluation signal, the driving conditions (the driving direction and the driving speed) of the focusing lens are controlled so as to reduce the blurring, so that zooming can be performed while suppressing the degree of blurring.

Figure 11:
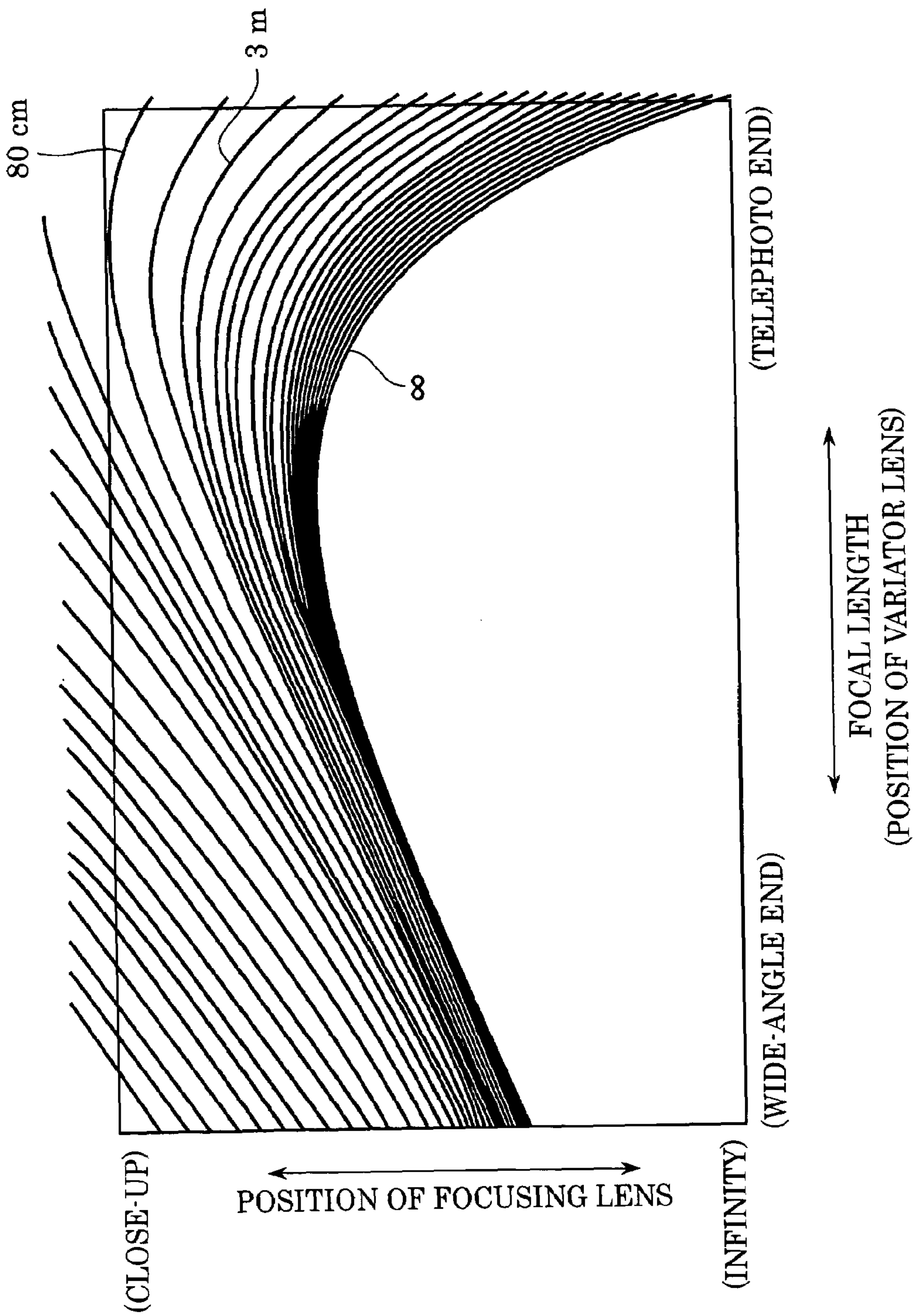
FIG. 11 is a graph showing in-focus trajectories for different object distances.

Accordingly, when zooming is performed from wide angle to telephoto, in which the in-focus trajectories for different object distances diverge from the converged state shown in FIG. 11, the moving speed Vf of the focusing lens is varied relative to the standard moving speed Vf0 (calculated using p(n+1) obtained from Equation (1)) such that the moving-direction vector is switched in accordance with the AF evaluation signal level, as shown by the trajectory 1305. Therefore, even if the standard moving speed Vf0 is not optimum for the object distance at that time, re-determination (re-generation) of the in-focus trajectory is performed while the AF evaluation signal level is prevented from being reduced below the minimum level 1302 (TH1) and blurring is suppressed to within a certain amount. In addition, by suitably setting the minimum level TH1, zooming can be performed while keeping image blurring indiscernible.

The moving speed Vf of the focusing lens is calculated by adding a positive correction speed Vf+ and a negative correction speed Vf− to the standard moving speed:

$$V_f = V_{f0} + V_{f+} \tag{4}$$

$$V_f = V_{f0} + V_{f-} \tag{5}$$

In order to eliminate bias in selecting the trajectory to be traced in the above-described zooming method, the correction speeds Vf+ and Vf− are determined such that the angle between the two direction vectors of the moving speed Vf obtained by Equations (4) and (5) is evenly divided by the direction vector of the standard moving speed Vf0.

In the above-described zooming control, focus detection is performed using the image signal from the imaging device. Therefore, the control process is typically performed in synchronization with a vertical synchronizing signal.

Figure 9:
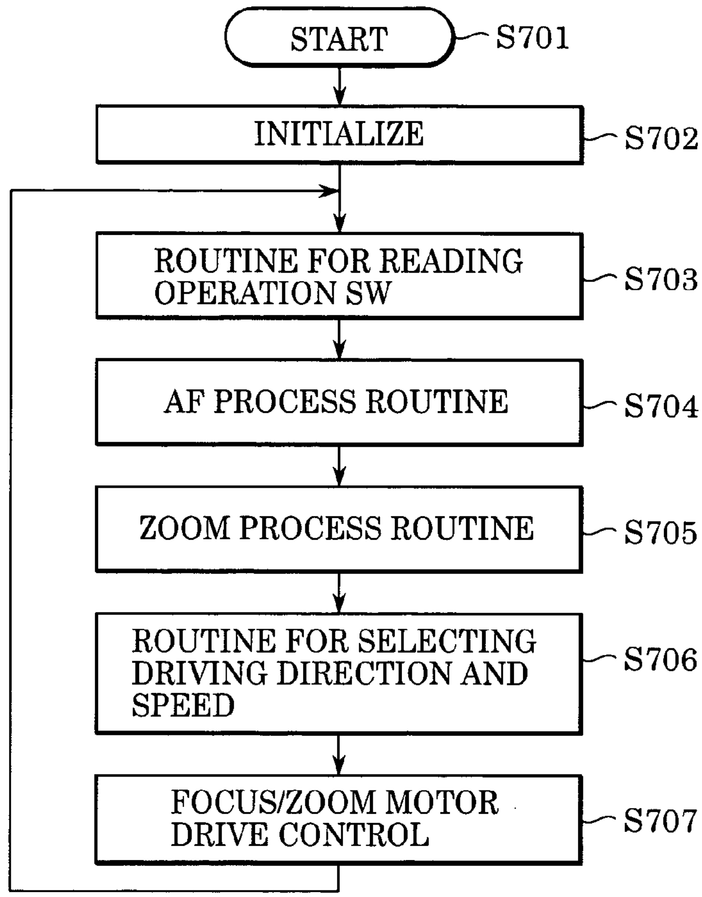
FIG. 9 is another flowchart showing the technical premise of the present invention.
Figure 10:
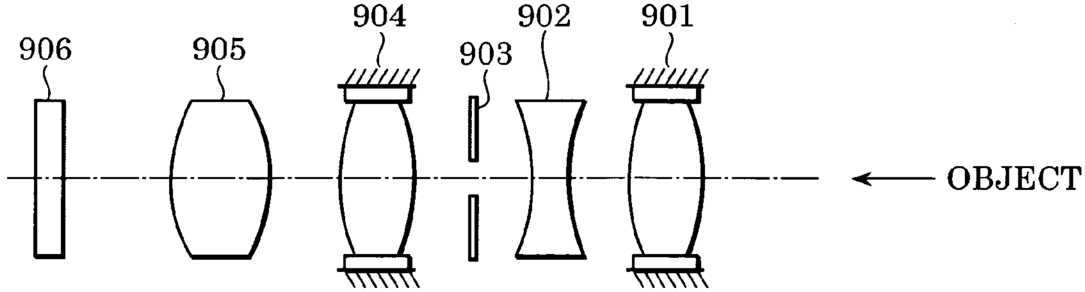
FIG. 10 is a schematic diagram showing the structure of a known taking optical system.

FIG. 9 is a flowchart of a zooming control process performed in the microcomputer. When the process starts in Step (abbreviated as S in the figures) 701, initialization is performed in Step 702. In this step, a random access memory (RAM) in the microcomputer and various ports are initialized.

In Step 703, the state of an operation unit in the camera is detected. The microcomputer receives information regarding a zoom switch unit operated by the user, and displays information of the zooming operation, such as the position of the zoom lens, on a display for informing the user that zooming is being performed. In Step 704, an AF process is performed. More specifically, automatic focus adjustment is performed in accordance with the variation in the AF evaluation signal.

In Step 705, a zooming process is performed. In this process, a compensating operation for maintaining the focused state during zooming is performed. More specifically, the standard driving direction and the standard driving speed of the focusing lens for tracing the trajectory shown in FIG. 12 are calculated.

In Step 706, driving directions and driving speeds with which the zoom lens and the focusing lens are to be driven during AF and zooming are selected from those calculated in the process routines of Steps 704 and 705. Then, the zoom lens is driven in a range between the telephoto and wide-angle ends and the focusing lens is driven in a range between the close-up and infinity ends, the ranges being provided by software so as to prevent the lenses from hitting the mechanical ends.

In Step 707, driving/stopping of the lenses is controlled by outputting control signals to motor drivers on the basis of the driving direction information and the driving speed information for zooming and focusing determined in Step 706. After Step 707 is completed, the process returns to Step 703.

The steps shown in FIG. 9 are performed in synchronization with the vertical synchronizing signal. Accordingly, in Step 703, the process waits to start another cycle until the next vertical synchronizing signal is input.

Figure 5:
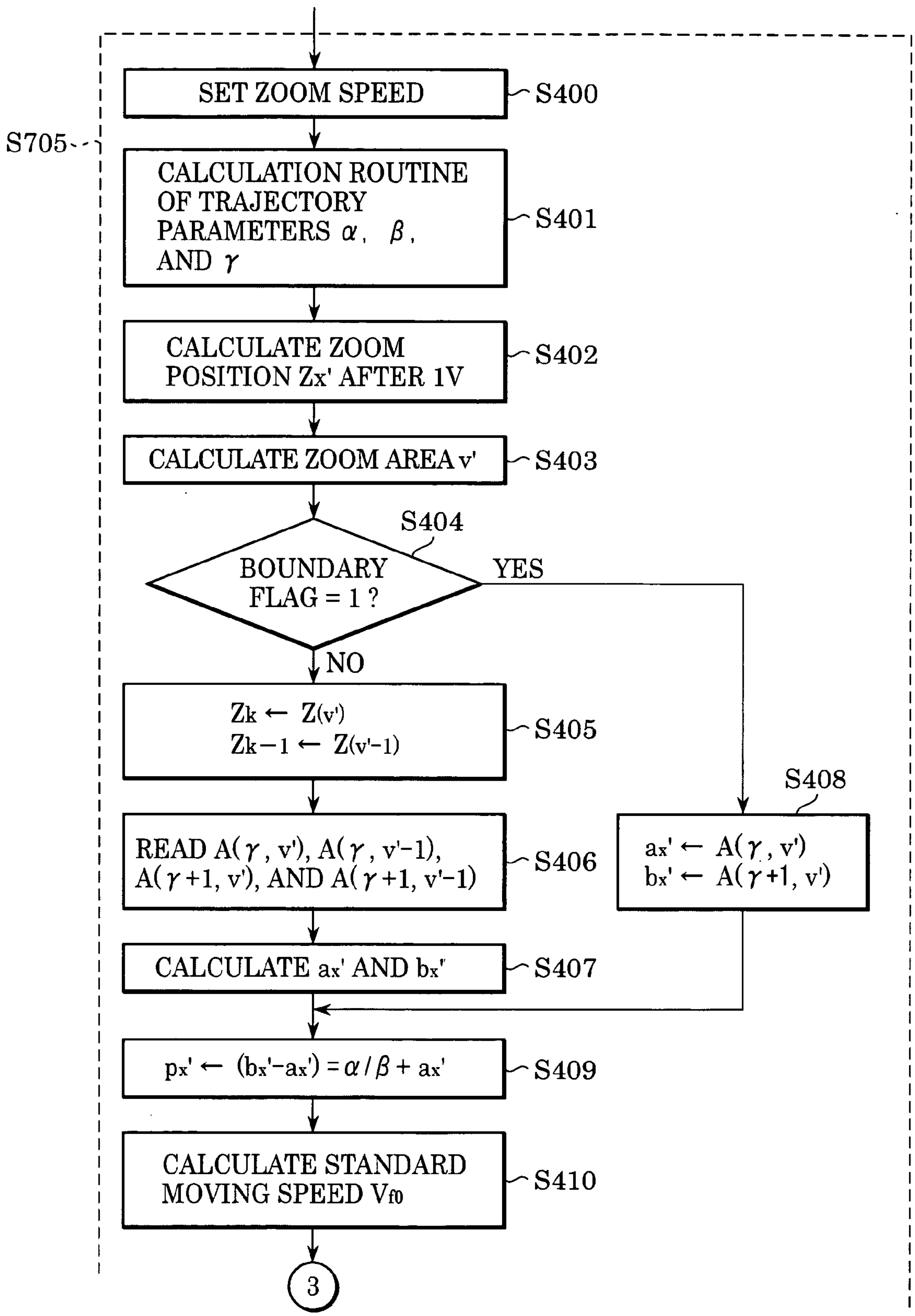
FIG. 5 is a flowchart showing the technical premise of the present invention.
Figure 6:
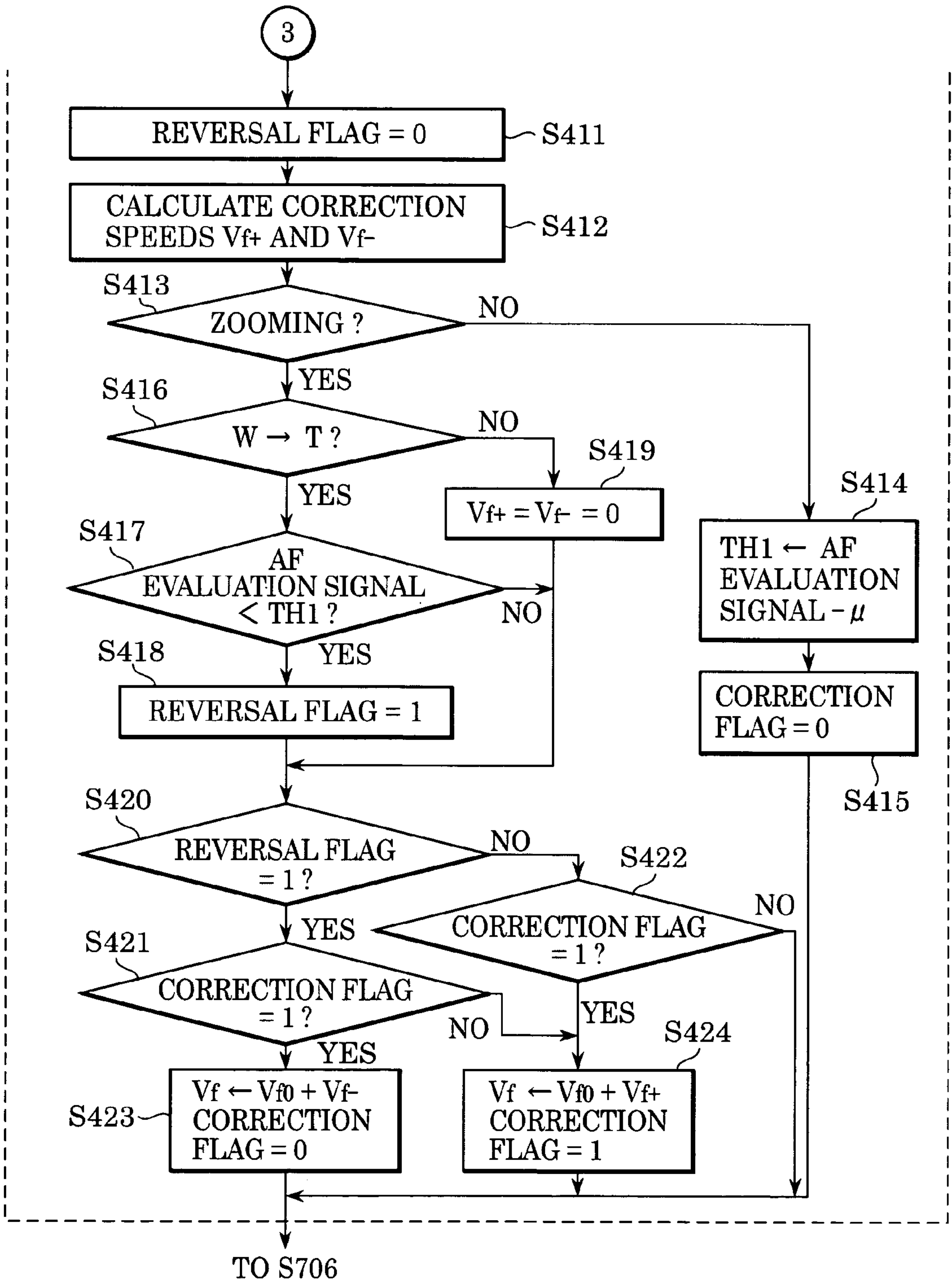
FIG. 6 is another flowchart showing the technical premise of the present invention.

FIGS. 5 and 6 show a control flow of a process performed by the microcomputer once every vertical synchronization period, and this process corresponds to the process performed in Step 705 of FIG. 9. FIGS. 5 and 6 are connected to each other at the circled number.

FIGS. 5 to 8 will be described below. In Step 400 of FIG. 5, a driving speed Zsp of a zoom motor for smooth zooming is set in accordance with the operational information of the zoom switch unit.

Figure 7:
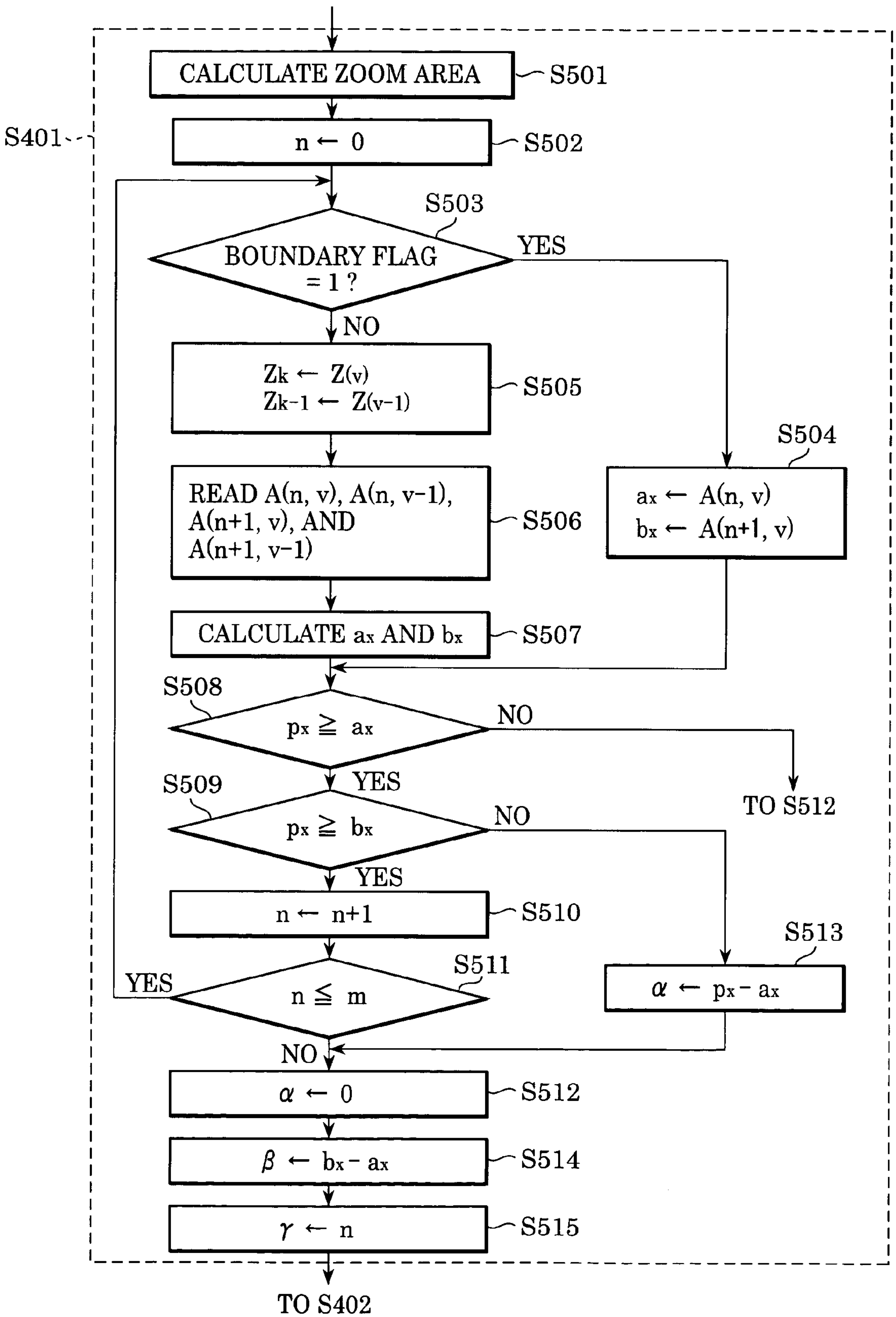
FIG. 7 is another flowchart showing the technical premise of the present invention.

In Step 401, the distance to the object being shot (object distance) is determined (estimated) on the basis of the current positions of the zoom lens and the focusing lens, and three trajectory parameters α, β, and γ (data for obtaining target-position information) are stored in a memory area, such as RAM, as the object-distance information. In this step, a process shown in FIG. 7 is performed. For simplification, the process of FIG. 7 will be explained on the assumption that the focused state is obtained at the current lens positions.

In Step 501 of FIG. 7, a zoom area v where the current zoom-lens position Zx is included is selected from among zoom areas obtained by dividing the area between the wide-angle and telephoto ends by a factor s in the data table of FIG. 14. A method for determining the zoom area will be described below with reference to FIG. 8.

First, the zoom-area parameter v is cleared in Step 601. Then, in Step 602, a zoom-lens position Z(v) on the boundary of the zoom area v is calculated as follows:

$$Z_{(v)}=(\text{telephoto position}-\text{wide-angle position})\times v/s+\text{wide-angle position} \quad (6)$$

In Equation (6), Z(v) corresponds to the zoom-lens positions Z0, Z1, Z2, . . . shown in FIG. 12.

In Step 603, it is determined whether or not Z(v) obtained in Step 602 is equal to the current zoom-lens position Zx. If the result is 'Yes', it is determined that the zoom-lens position Zx is on the boundary of the zoom area v, and a boundary flag is set to 1 in Step 607.

If the result is 'No' in Step 603, it is determined whether or not Zx<Z(v) is satisfied in Step 604. If the result is 'Yes' in Step 604, it means that Zx is positioned between Z(v−1) and Z(v), and the boundary flag is set to 0 in Step 606. If the result is 'No' in Step 604, the zoom-area parameter v is incremented in Step 605 and the process returns to Step 602.

Figure 8:
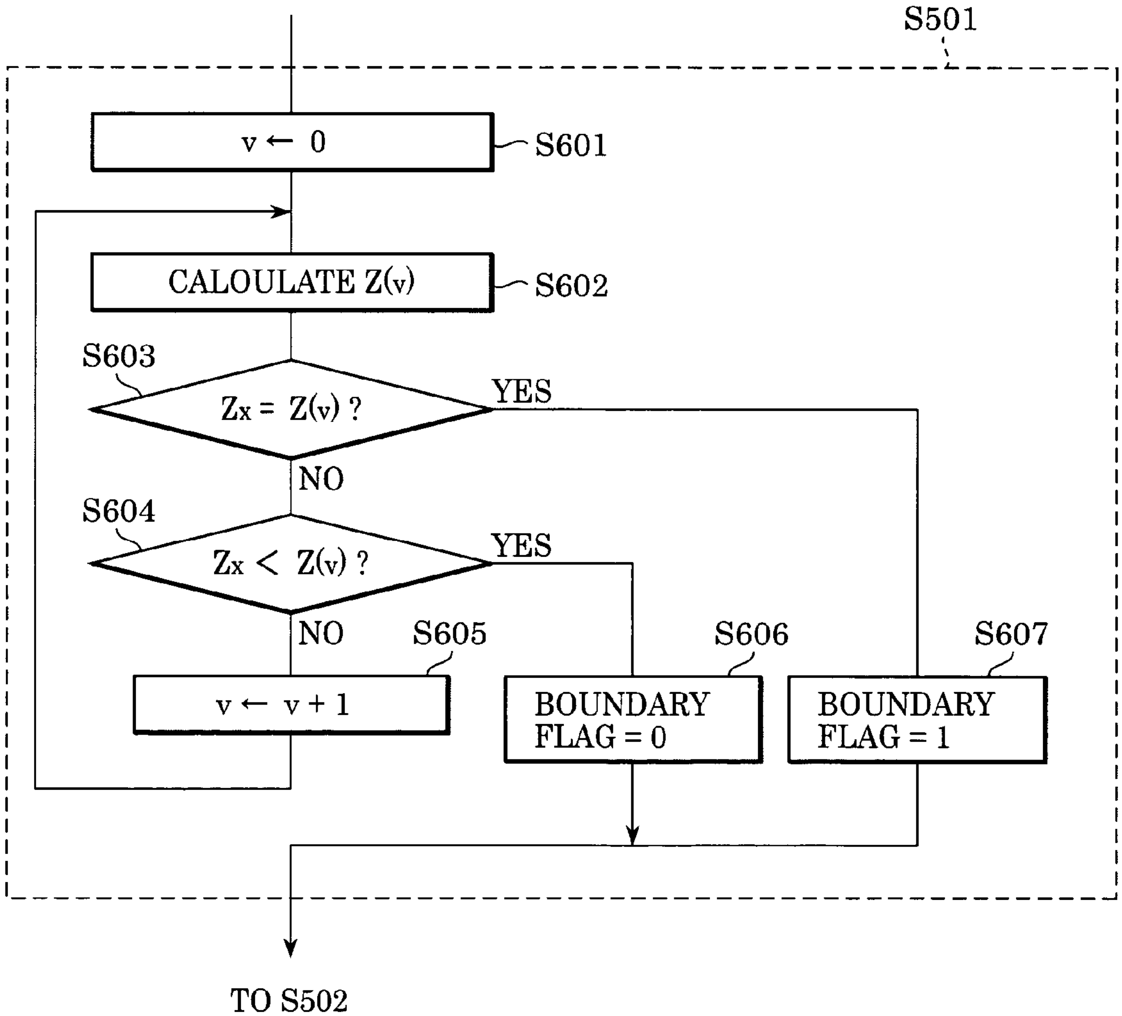
FIG. 8 is another flowchart showing the technical premise of the present invention.

The above-described steps are repeatedly performed so that when the process of FIG. 8 is finished, it is determined that the current zoom-lens position Zx is in the kth zoom area (v=k) in the data table of FIG. 14. In addition, it is also determined whether or not Zx is on the boundary of the zoom area.

Thus, with reference to FIG. 7 again, the current zoom area is determined in Step 501 by the process of FIG. 8. Then, the position of the focusing lens in the data table of FIG. 14 is determined.

First, an object-distance parameter n is cleared in Step 502. Then, in Step 503, it is determined whether or not the current zoom-lens position is on the boundary of the zoom area. If the boundary flag is set to 0, the current zoom-lens position is not on the boundary, and the process proceeds to Step 505.

In Step 505, Z(v) is set to Zk and Z(v−1) is set to Zk−1. Next, in Step 506, four table data items A(n, v−1), A(n, v), A(n+1, v−1), and A(n+1, v) are read out. Then, in Step 507, ax and bx are calculated from Equations (2) and (3).

If it is determined that the boundary flag is set to 1 in Step 503, the process proceeds to Step 504, and the in-focus position A(n, v) for the object distance n and the zoom-lens position (v in this case) and the in-focus position A(n+1, v) for the object distance n+1 and the zoom-lens position are read out and memorized as ax and bx, respectively.

In Step 508, it is determined whether or not the current focusing-lens position px is ax or more. If px is ax or more, it is determined whether or not the current focusing-lens position px is bx or more in Step 509. If px is less than bx, it means that the focusing-lens position px is between the positions corresponding to the object distances n and n+1, and the corresponding trajectory parameters are memorized in Steps 513 to 515. More specifically, α=px−ax is set in Step 513, β=bx−ax is set in Step 514, and γ=n is set in Step 515.

When the result is 'No' in Step 508, the focusing-lens position px is at the infinity end. In this case, α=0 is set in Step 512. Then, the process proceeds to Step 514, and trajectory parameters for infinity are memorized.

If the result is 'Yes' in Step 509, it means that the focusing-lens position px is closer to the close-up end. In this case, the object-distance parameter n is incremented in Step 510, and the cam trajectory data being referred to in the data table shown in FIG. 14 is shifted closer to the close-up end by a single column. Then, the incremented object-distance parameter is used in the next cycle for obtaining values to be compared with the focusing-lens position px. Then, in Step 511, it is determined whether or not the object-distance parameter n is larger than the trajectory number m for the close-up end, that is, it is determined whether or not the object distance set in Step 510 is closer to infinity than the close-up end. If the object distance is closer to infinity than the object distance m corresponding to the close-up end, the process returns to Step 503. If the result is 'No' in Step 511, it means that the focusing-lens position px is at the close-up end. In this case, the process proceeds to Step 512 and the trajectory parameters for the close-up end are memorized.

With reference to FIGS. 5 and 6 again, the trajectory parameters for selecting the trajectory corresponding to the current zoom-lens position and the current focusing-lens position from among the trajectories shown in FIG. 11 are memorized in Step 401.

Then, in Step 402, the position Zx' reached by the zoom lens after a single vertical synchronization period (1V) (the position to which the zoom lens moves from the current position) is calculated. If the zoom speed determined in Step 400 is Zsp (pps), the zoom-lens position Zx' after the vertical synchronization period is calculated as follows:

$$Z_x' = Z_x \pm Zsp/\text{vertical synchronization frequency} \quad (7)$$

Here, pps is the unit of rotational speed of a stepping motor, and represents the number of steps taken per second (1 step=1 pulse). In addition, with respect to the sign in Equation (7), + represents the moving direction of the zoom lens toward the telephoto end, and − represents the moving direction of the zoom lens toward the wide-angle end.

Next, the zoom area v' where $Z_x'$ is included is determined in Step 403. In Step 403, a process similar to that of FIG. 8 is performed by substituting $Z_x$ and v in FIG. 8 by $Z_x'$ and v', respectively.

Next, in Step 404, it is determined whether or not the zoom-lens position $Z_x'$ after the vertical synchronization period is on the boundary of the zoom area. If the boundary flag=0, the zoom-lens position $Z_x'$ is not on the boundary and the process proceeds to Step 405.

In Step 405, Z(v') is set to $Z_k$ and Z(v'−1) is set to $Z_{k-1}$. Next, in Step 406, four table data items $A_{(\gamma,\ v'-1)}$, $A_{(\gamma,\ v')}$, $A_{(\gamma+1,\ v'-1)}$, $A_{(\gamma+1,\ v')}$ corresponding to the object distance γ determined by the process shown in FIG. 7 are read out. Then, in Step 407, $a_x'$ and $b_x'$ are calculated from Equations (2) and (3). If the result is 'Yes' in Step 404, the process proceeds to Step 408 and the in-focus position $A_{(\gamma,\ v')}$ for the object distance γ and the zoom area v' and the in-focus position $A_{(\gamma+1,\ v')}$ for the object distance γ+1 and the zoom area v' are read out and memorized as $a_x'$ and $b_{x'}$, respectively.

Then, in Step 409, the in-focus position (target position) $p_x'$ to which the focusing lens is to be moved when the zoom lens reaches the position $Z_x'$ is calculated. The target position $p_x'$ to which the focusing lens is to be moved after the vertical synchronization period is calculated using Equation (1) as follows:

$$p_x' = (b_x' - a_x') \times \alpha/\beta + a_x' \quad (8)$$

Accordingly, the difference ΔF between the target position and the current focusing-lens position is obtained as follows:

$$\Delta F = (b_x' - a_x') \times \alpha/\beta + a_x' - p_x$$

Next, in Step 410, the standard moving speed Vf0 of the focusing lens is calculated. Vf0 is calculated by dividing the displacement ΔF of the focusing lens by the time required for the zoom lens to move the corresponding distance.

Next, a method for calculating the correction speeds used in the moving-speed correction (zigzag movement) of the focusing lens shown in FIGS. 15A and 15B will be described below.

In Step 411, various parameters are initialized and a reversal flag used in the following steps is cleared. In Step 412, the correction speeds Vf+ and Vf− used in the zigzag movement are calculated from the standard moving speed Vf0 obtained in Step 410.

Figure 16:
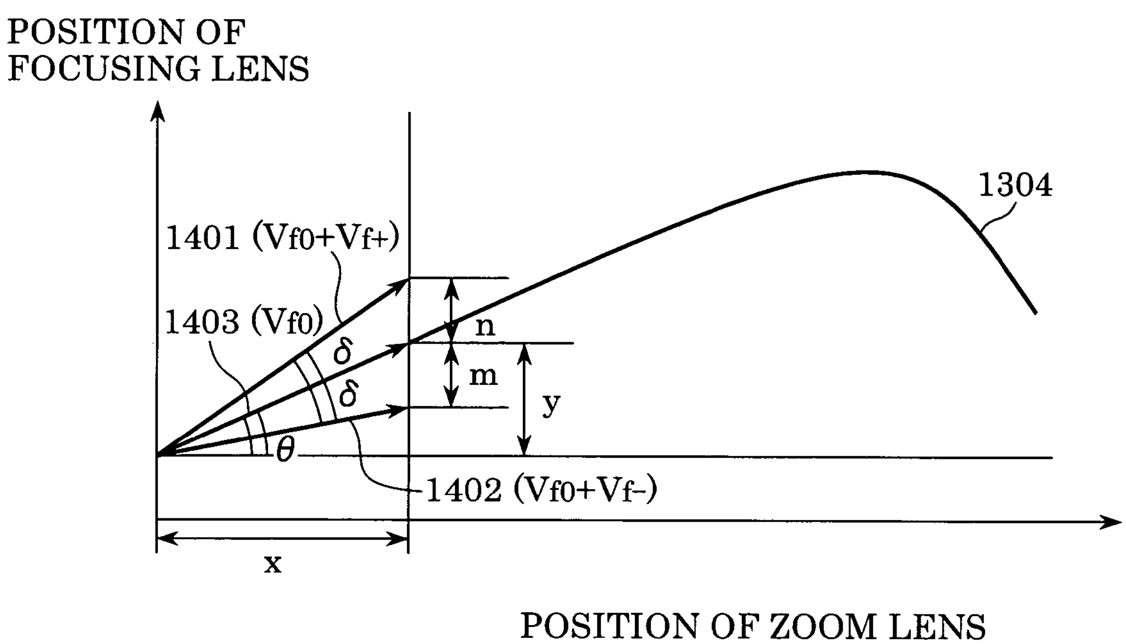
FIG. 16 is a diagram showing the technical premise of the present invention.

A correction parameter δ and the correction speeds Vf+ and Vf− are calculated as described below. FIG. 16 is a diagram for explaining a method for calculating the correction speeds Vf+ and Vf− from the correction parameter δ. In FIG. 16, the horizontal axis shows the zoom-lens position and the vertical axis shows the focusing-lens position. The trajectory to be traced is denoted by 1304.

The focus speed at which the focusing-lens position changes by y when the zoom-lens position changes by x (which means the focusing lens reaches the target position) is defined as the standard speed Vf0 denoted by 1403. In addition, the focus speeds at which the focusing-lens position changes by distances shifted from y by n and m when the zoom-lens position changes by x are defined as the correction speeds Vf+ and Vf−, respectively. The direction vector of the speed for driving the focusing lens to a position closer to the close-up end than the displacement y, that is, the direction vector of the sum of the standard speed Vf0 and the positive correction speed Vf+, is denoted by 1401. In addition, the direction vector of the speed for driving the focusing lens to a position closer to the infinity end than the displacement y, that is, the direction vector of the sum of the standard speed Vf0 and the negative correction speed Vf−, is denoted by 1402. The values n and m are determined such that an angle between the direction vector 1401 and a direction vector 1403 of the standard speed Vf0 and that between the direction vector 1401 and the direction vector 1403 of the standard speed Vf0 are set to the same angle δ.

First, m and n are determined. From FIG. 16, the following equations are satisfied:

$$\tan\theta = y/x,\ \tan(\theta-\delta) = (y-m)/x,\ \text{and}\ \tan(\theta+\delta) = (y+n)/x \quad (9)$$

$$\tan(\theta\pm\delta) = (\tan\theta \pm \tan\delta)/(1\pm(-1)\times\tan\theta\times\tan\delta) \quad (10)$$

Accordingly, n and m are calculated from Equations (9) and (10) as follows:

$$m = (x2+y2)/(x/k+y) \quad (11)$$

$$n = (x2+y2)/(x/k-y) \quad (12)$$

where tan δ=k

The correction angle δ is a parameter determined from the depth of field, the focal length, etc. Accordingly, the period of the variation in the AF evaluation signal level which varies depending on the driving state of the focusing lens is maintained constant relative to the displacement of the focusing lens, and the possibility of incorrect determination of the in-focus trajectory to be traced by the focusing lens during zooming is reduced.

The calculations of Equations (11) and (12) are performed by reading out a data table representing the relationship between δ and k from the memory included in the microcomputer as necessary.

When the zoom-lens position changes by x per unit time, the zoom speed Zsp, the focus standard speed Vf0, and the correction speeds Vf+ and Vf− are defined as follows:

$$Zsp = x,$$

$$V_{f0} = y,$$

$$V_{f+} = n \text{ and } V_{f-} = m$$

Accordingly, the correction speeds Vf+ and Vf− (negative speed) are calculated from Equations (11) and (12).

In Step 413, it is determined whether or not zooming is performed on the basis of the information showing the operational state of the zoom switch unit obtained in Step 703 of FIG. 9. When zooming is performed, the process proceeds to Step 416. When zooming is not performed, the process proceeds to Step 414, and TH1 is set to a value obtained by subtracting a predetermined constant $\mu$ from the current AF evaluation signal level. As described above with reference to FIG. 15A, TH1 is the AF evaluation signal level used as the criterion for switching the correcting-direction vector (the switching criterion for the zigzag movement). TH1 is determined immediately before zooming starts, and this value corresponds to the minimum level 1302 in FIG. 15A.

Then, in Step 415, a correction flag is cleared and the process is finished. The correction flag shows whether positive correction is applied (correction flag=1) or negative correction is applied (correction flag=0) in the trajectory tracing.

If it is determined that zooming is performed in Step 413, it is determined whether or not the zooming direction is from wide angle to telephoto in Step 416. If the zooming direction is from telephoto to wide angle, Vf+=0 and Vf−=0 are set in Step 419 and the process proceeds to Step 420. If the zooming direction is from wide angle to telephoto, it is determined whether or not the current AF evaluation signal level is less than TH1 in Step 417. If the current AF evaluation signal level is TH1 or more, the process proceeds to Step 420. If the current AF evaluation signal level is less than TH1, which means that the current AF evaluation signal level is reduced to below the minimum level TH1 (1302) shown in FIG. 15A, a reversal flag is set to 1 in Step 418 to switch the correcting direction.

In Step 420, it is determined whether or not the reversal flag is set to 1. If the reversal flag is set to 1, it is determined whether or not the correction flag is set to 1 in Step 421. If the correction flag is not set to 1 in Step 421, the correction flag is changed to 1 (positive correction) in Step 424 and the moving speed Vf of the focusing lens is set to Vf0+Vf+ (Vf+≧0) from Equation (4).

If the correction flag is set to 1 in Step 421, the correction flag is changed to 0 (negative correction) in Step 423 and the moving speed Vf of the focusing lens is set to Vf0+Vf− (Vf−≦0) from Equation (5).

If the reversal flag is not set to 1 in Step 420, it is determined whether or not the correction flag is set to 1 in Step 422. The process proceeds to Step 424 if the correction flag is set to 1, and to Step 423 if the correction flag is not set to 1.

After this process, the driving directions and the driving speeds of the focusing lens and the zoom lens are determined depending on the operation mode in Step 706 of FIG. 9. In the zooming operation, the driving direction of the focusing lens is set to the direction toward the close-up end or the direction toward the infinity end depending on whether the moving speed Vf of the focusing lens determined in Step 423 or 424 is positive or negative. Thus, the trajectory to be traced is re-determined while performing the zigzag movement of the focusing lens.

The technical premise of the present invention has been described in the foregoing, and embodiments of the present invention, mainly the differences from the technical premise, will now be described below.

First Embodiment

Figure 1:
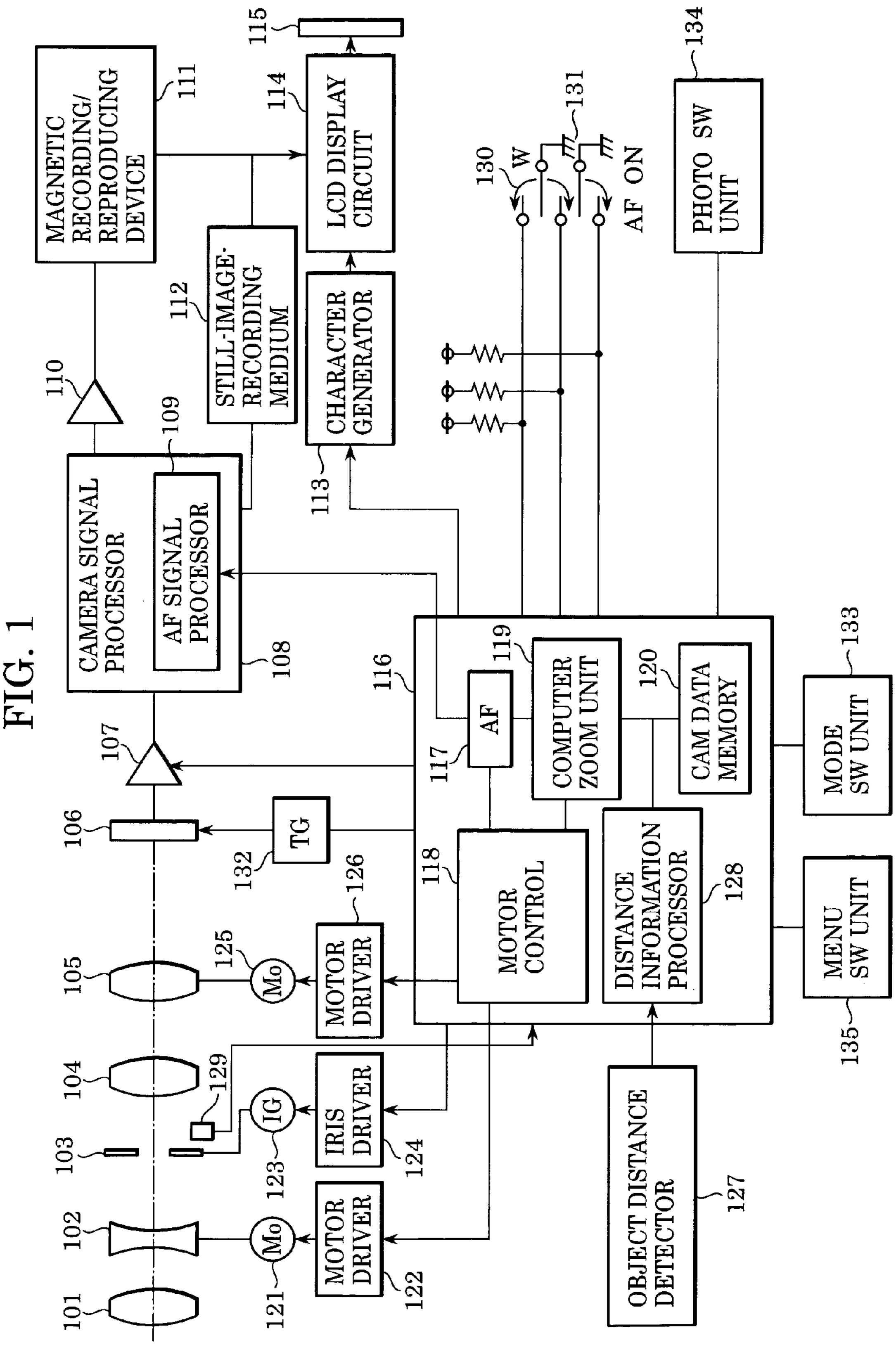
FIG. 1 is a block diagram showing the structure of a video camera according a first embodiment of the present invention.

FIG. 1 shows the structure of a video camera which serves as an imaging apparatus (optical apparatus) including a lens-controlling device according to a first embodiment of the present invention. In the first embodiment, the present invention is applied to an imaging apparatus with a built-in taking lens. However, the present invention may also be applied to an interchangeable lens system (optical apparatus) of an imaging system including a camera and the interchangeable lens system attached to the camera. In such a case, a microcomputer included in the lens system performs a zooming operation described below in response to a signal transmitted from the camera. In addition to the video camera, the present invention may also be applied to various imaging apparatuses such as a digital still camera.

With reference to FIG. 1, a taking optical system includes a fixed front lens unit 101, a zoom lens unit 102 (first lens unit) which moves along an optical axis for zooming, a diaphragm 103, a fixed lens unit 104, and a focusing lens unit 105 (second lens unit) which also moves along the optical axis and has both a focus adjustment function and a compensating function of correcting the displacement of an image plane caused by zooming are arranged, in that order from an object. The taking optical system is a rear-focus optical system including four lens units with positive, negative, positive, and positive optical powers in that order from the object (from the left in the figure). Although the lens units are shown as if each of them includes only one lens in the figure, each lens unit may include either a single lens or a plurality of lenses.

Reference numeral 106 denotes an imaging device, such as a charge-coupled device (CCD) and a complementary metal-oxide semiconductor (CMOS) sensor. Light from the object passes through the taking optical system and forms an image on the imaging device 106. The imaging device 106 performs a photoelectric conversion of the object image formed thereon, and outputs an image signal. The image signal is amplified to an optimum level by an automatic gain control (AGC) amplifier 107, and is input to a camera-signal-processing circuit 108. The camera-signal-processing circuit 108 converts the image signal input thereto into a standard television signal, and then outputs the standard television signal to an amplifier 110. The amplifier 110 amplifies the television signal to an optimum level, and outputs the amplified television signal to a magnetic recording/reproducing device 111, where the signal is recorded on a magnetic recording medium such as a magnetic tape. The recording medium may also be a semiconductor memory, an optical disc, or the like.

The television signal amplified by the amplifier 110 is also transmitted to a liquid crystal display (LCD) circuit 114, and an image corresponding to the television signal is displayed on an LCD 115. The LCD 115 also displays a message for informing the user of a shooting mode, a shooting state, a warning, etc. More specifically, the camera microcomputer 116 controls a character generator 113 so as to mix the output from the character generator 113 with the television signal transmitted to the LCD display circuit 114, and thereby superimposes the message on the image being displayed.

The image signal input to the camera-signal-processing circuit 108 may also be compressed using an internal memory and be recorded on a still-image-recording medium 112 such as a card media.

The image signal input to the camera-signal-processing circuit 108 is also input to an AF-signal-processing circuit 109 which functions as a focus-information generator. An AF evaluation signal (focus information) is generated by the AF-signal-processing circuit 109 and is read out by the camera microcomputer 116 as data.

In addition, the camera microcomputer 116 checks the states of a zoom switch 130 and an AF switch 131, and detects the state of a photo switch 134.

When the photo switch 134 is half-pressed, a focusing operation in an AF mode is started and the focus is locked in the focused state. When the photo switch 134 is fully-pressed, the focus is locked irrespective of the focus state and an image is taken into a memory (not shown) in the camera-signal-processing circuit 108. Then, the obtained image is recorded on the magnetic tape or the still-image-recording medium 112.

In addition, the camera microcomputer 116 determines whether the shooting mode is set to a moving-image-shooting mode or a still-image-shooting mode depending on the state of a mode switch 133, and controls the magnetic recording/reproducing device 111 and the still-image-recording medium 112 using the camera-signal-processing circuit 108. More specifically, the camera microcomputer 116 supplies the television signal suitable for the recording medium or plays back the television signal recorded in the magnetic recording/reproducing device 111 or the still-image-recording medium 112 when the mode switch 133 is set to a playback mode.

When the AF switch 131 is turned off and the zoom switch 130 is operated, a computer zoom unit (controller) 119 included in the camera microcomputer 116 transmits a signal to a zoom motor driver 122 in accordance with a program stored in the computer zoom unit 119 such that that the zoom motor driver 122 drives the zoom lens unit 102 with the zoom motor 121 in the telephoto or wide-angle direction depending on the direction in which the zoom switch 130 is operated. In addition, the computer zoom unit 119 refers to lens cam data (representative-trajectory data for a plurality of object distances shown in FIG. 11 or trajectory parameter data) stored in a cam data memory 120 in advance, and controls a focus motor driver 126 on the basis of the lens cam data such that the focus motor driver 126 drives the focusing lens unit 106 with a focus motor 125 to correct the displacement of the image plane caused by zooming.

When the AF switch 131 is turned on and the zoom switch 130 is operated, an AF control unit 117 in the camera microcomputer 116 performs the zooming operation while maintaining the focused state. Accordingly, the computer zoom unit 119 drives the zoom lens unit 102 and the focusing lens unit 105 in accordance with the internal program on the basis of not only the lens cam data stored in the cam data unit 120 but also the AF evaluation signal transmitted from the AF-signal-processing circuit 109 and information of a distance to the object (target to be focused on) obtained from an object-distance detector circuit 127.

The output signal from the object-distance detector circuit 127 is processed by a distance-information processor 128 included in the camera microcomputer 116, and is output to the computer zoom unit 119 as object-distance information.

When the AF switch 131 is turned on and the zoom switch 130 is not operated, the AF control unit 117 outputs a signal to the focus motor driver 126 such that the focus motor driver 126 drives the focusing lens 105 with the focus motor 125 so as to maximize the AF evaluation signal transmitted from the AF-signal-processing circuit 109. Thus, an automatic focus adjustment is performed.

The object-distance detector circuit 127 measures the distance to the object by a three-point measurement method using an active sensor, and outputs the measurement result as the distance information. In this case, the active sensor may be an infrared sensor which is commonly used in compact cameras.

Although the distance detection is performed by the three-point measurement method in the present embodiment, the method for detecting the distance is not limited to this. For example, the distance may also be detected using a TTL phase-difference detection method. In such a case, light from an exit pupil of the taking lens is divided by a light-dividing device, such as a half-prism or a half-mirror, and light components obtained by the light-dividing device are guided to at least two line sensors via sub-mirrors and imaging lenses. Then, the direction and amount of shift between the outputs from the line sensors are detected on the basis of the correlation between the outputs, and the distance to the object is determined on the basis of the result of detection.

Figure 17:
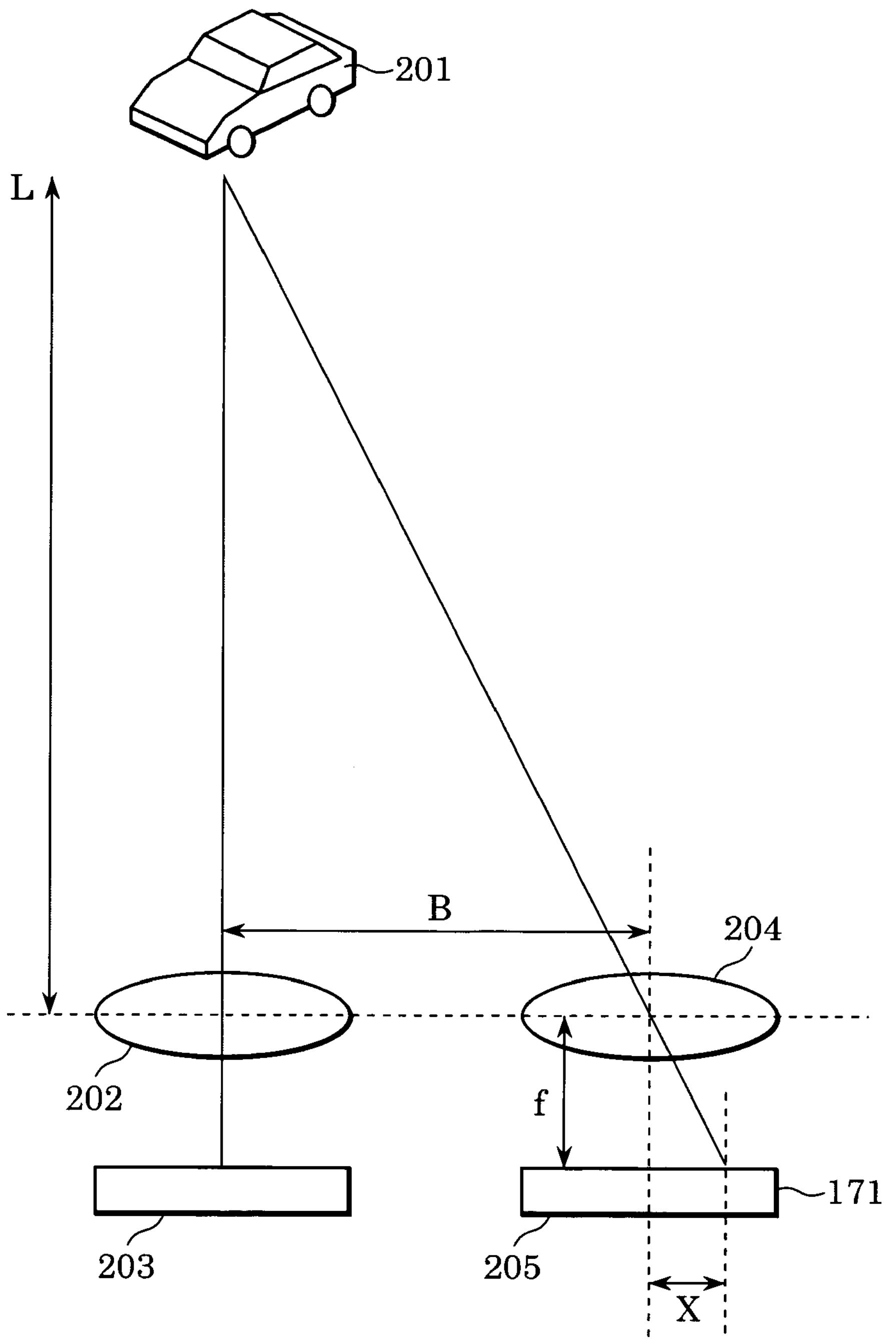
FIG. 17 is a diagram for explaining a three-point measurement of a distance.
Figure 18:
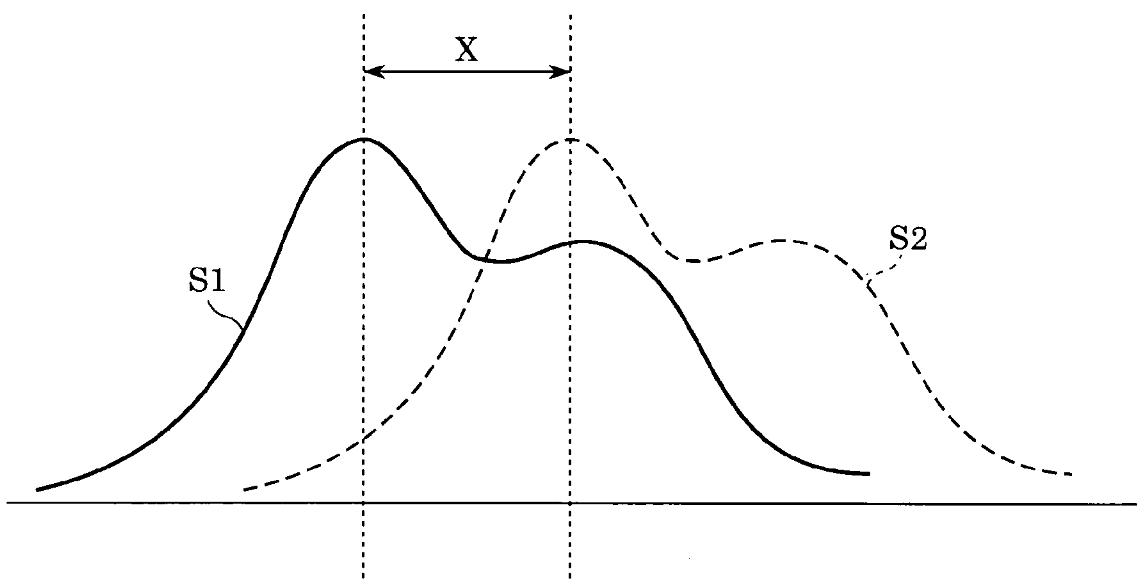
FIG. 18 is a diagram for explaining a distance measurement using a phase-difference detection method.

The principle of distance calculation using the three-point measurement method and the phase-difference detection method will be described below with reference to FIGS. 17 and 18. FIG. 17 shows an object 201, an imaging lens 202 for a first optical path, a line sensor 203 for the first optical path, an imaging lens 204 for a second optical path, and a line sensor 205 for the second optical path. The two line sensors 203 and 205 are separated from each other by a reference length B. A component of light from the object 201 which travels along the first optical path passes through the imaging lens 202 to form an image on the line sensor 203, and another component of light from the object 201 which travels along the second optical path passes through the imaging lens 204 to form an image on the line sensor 205. FIG. 18 shows examples of signals output from the line sensors 203 and 205 on which the light components which travel along the first and second optical paths form the respective object images. Since the two line sensors are separated from each other by the reference length B, the object-image signals are shifted from each other by X pixels, as is understood from FIG. 17. X is determined by calculating the correlation between the two signals while shifting them relative to each other and determining the number of pixels corresponding to the amount of shift at which maximum correlation is obtained. A distance L to the object is calculated as $L=B\times f/X$ from the principal of three-point measurement using X, the reference length B, and a focal length f of the imaging lenses 202 and 204.

Alternatively, the distance to the object may also be detected using an ultrasonic sensor by measuring a propagation speed of an ultrasonic wave.

The distance information obtained from the object-distance detector circuit 127 is transmitted to the distance-information processor 128. The distance-information processor 128 performs three kinds of processes which are described below.

1. In a first process, the cam trajectory corresponding to the current positions of the zoom lens unit 102 and the focusing lens unit 105 is selected from the trajectories shown in FIG. 11, and the object distance corresponding to the selected cam trajectory is determined. The cam trajectory is calculated using the current lens-unit positions by, for example a process similar to Step 401 of FIG. 5 as an imaginary cam trajectory defined by the trajectory parameters $\alpha$, $\beta$, and $\gamma$ and dividing the area between the cam trajectories corresponding to columns $\gamma$ and $\gamma+1$ in the table of FIG. 14 at an internal ratio of $\alpha/\beta$. Then, the object distance corresponding the cam trajectory is determined in units of meters. The trajectory parameters $\alpha$, $\beta$, and $\gamma$ and the object distance are converted into each other using a predetermined correlation table, and the actual distance to the main object is output accordingly.

2. In a second process, inverse conversion of the actual object distance obtained by the object-distance detector circuit 127 is performed using the above-described correlation table, and the cam trajectory defined by the trajectory parameters α, β, and γ in FIG. 11 is determined. The inverse conversion using the correlation table is performed without using the data in a region around the wide-angle end where the cam trajectories converge in FIG. 11, and data in a region around the telephoto end where the trajectories are separated from each other is used so as to obtain the trajectory parameters with high resolution.

3. In a third process, the difference between the object distances obtained in the first and second processes and the direction of the difference are calculated.

Among the above-described first, second, and third processes, the cam trajectory data corresponding to the distance detected by the object-distance detector circuit 127 is determined in the second process.

The camera microcomputer 116 also performs exposure control. More specifically, the camera microcomputer 116 refers to a brightness level of the television signal generated by the camera-signal-processing circuit 108, and controls the aperture in the diaphragm 103 using an iris driver 124 for driving an IG meter 123 such that the brightness level becomes adequate for the exposure. The aperture of the diaphragm 103 is detected by an iris encoder 129, and is fed back to the control system for controlling the diaphragm 103. When adequate exposure control cannot be performed using only the diaphragm 103, an exposure time of the imaging device 106 is controlled using a timing generator (TG) 132 in a range from high-speed shutter to so-called slow shutter (long-time exposure). In addition, in the case in which sufficient exposure cannot be performed due to, for example, low illumination, the gain of the television signal is controlled using the amplifier 107.

The user operates a menu switch unit 135 to manually set a shooting mode suitable for the shooting conditions and to switch the function of the camera.

Next, an algorithm used in the zooming operation will be described below with reference to FIG. 2. In the present embodiment, the computer zoom unit 119 included in the camera microcomputer 116 performs the processes described below, which include the above-described process flows (programs).

In the zooming operation of the present embodiment, information of a position on the in-focus trajectory (zoom tracking curve) to be traced by the focusing lens unit 105, that is, a target-position, is generated on the basis of the distance information obtained by the object-distance detector circuit 127. The process flow shown in FIG. 2 corresponds to an example in which zooming is performed while determining the zoom tracking curve using the obtained object-distance information. The method used in this example is advantageous in super-high-speed zooming or the like where the detection period of the AF evaluation value is long and the zoom tracking curve cannot be determined with sufficient accuracy when only the TV-AF reference signal is used.

Figure 2:
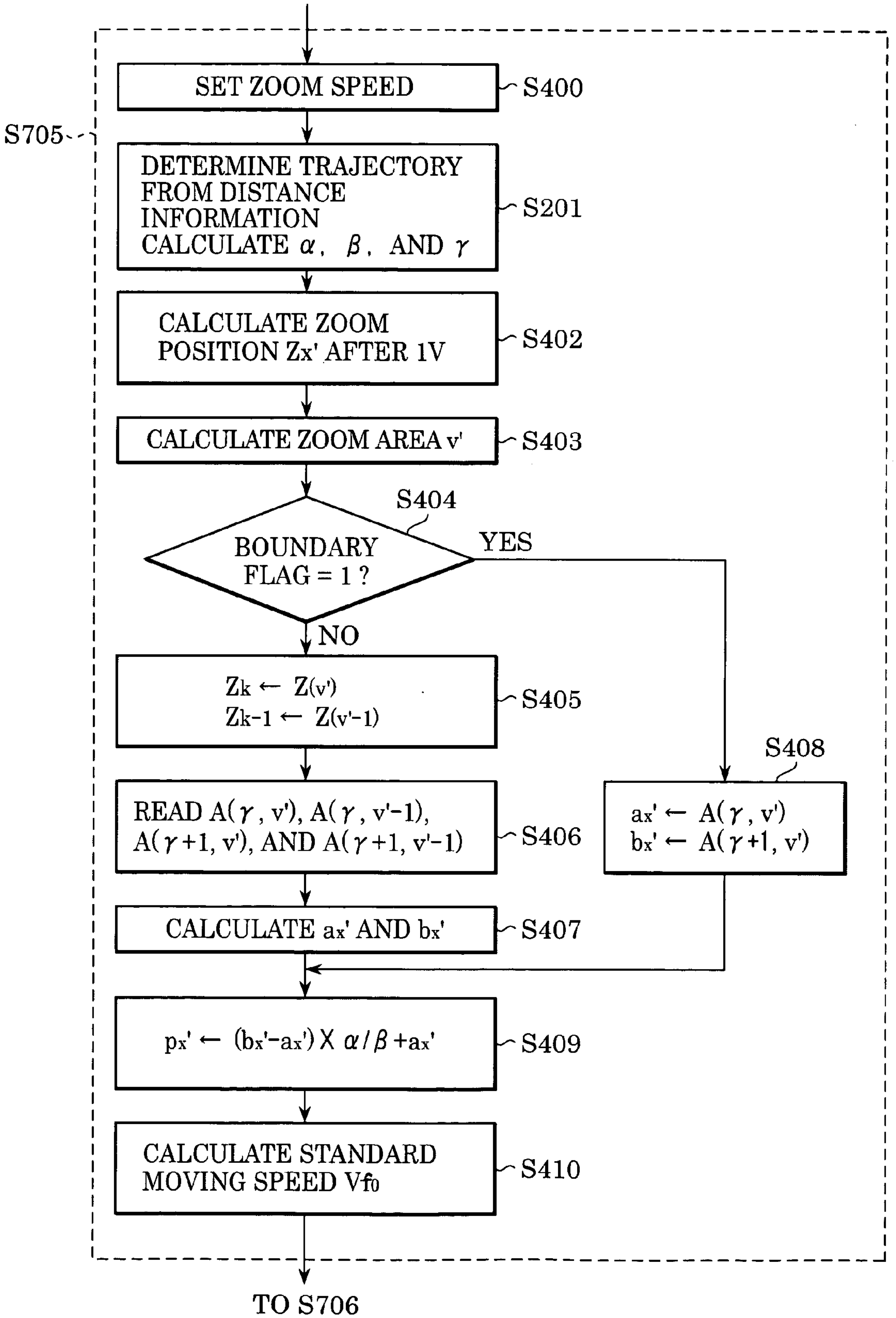
FIG. 2 is a flowchart showing an operation of the video camera according to the first embodiment.

In the present embodiment, a process shown in FIG. 2 corresponds to the process performed in Step 705 of FIG. 9. Steps similar to those shown in FIGS. 5 and 6 are denoted by the same reference numerals, and explanations thereof are thus omitted.

First, a zoom speed in the zooming operation is determined in Step 400. In Step 201, the distance-information processor 128 performs a cam-trajectory determining process using the output signal from the object-distance detector circuit 127. In this process, the in-focus trajectory corresponding to the current object distance, that is, the distance to the main object (target to be focused on), is selected from among a plurality of in-focus trajectories (see FIG. 11) which are stored in the cam data memory 120 in advance as the lens cam data. More specifically, the trajectory parameters α, β, and γ are determined by the inverse conversion of the actual distance using the correlation table.

Instead of performing the above-described inverse conversion, the correlation between the object distance and the in-focus trajectory to be selected may also be obtained using another table data as described below. For example, table data showing the correlation between the distance variation and the trajectory parameters in a range where the trajectory curves for the representative object distances have a constant shape may be prepared so that the trajectory parameters (that is, the in-focus trajectory to be selected) can be determined from the distance information. For the object distances corresponding to the cam curves whose shapes vary, a plurality of look-up tables for individual correlations are prepared. Accordingly, the trajectory parameters can be determined for all of the object distances. With respect to the focal length, the trajectory parameters α, β, and γ are determined using a long-focal-length area, where the resolution of the trajectory parameters is high, in the discrete cam trajectory information shown in FIG. 11 which is stored in the memory as data. Therefore, even when the current lens position is near the wide-angle end in FIG. 11 where the cam trajectories converge, the trajectory parameters can be obtained at a point near the telephoto end in FIG. 11, where the cam trajectories diverge, on the basis of the detected distance information. Thus, the cam trajectory to be traced is determined by calculation (interpolation) based on the trajectory parameters while the current lens position is near the wide-angle end. Then, after the trajectory parameters are obtained in this manner, information of a position on the trajectory to be traced by the focusing lens unit 105 (target-position information) is generated in the steps described below.

In Step 402, the position Zx' reached by the zoom lens after a single vertical synchronization period (1V) (the position to which the zoom lens moves from the current position) is calculated. If the zoom speed determined in Step 400 is Zsp (pps), the zoom-lens position $Z_x'$ after the vertical synchronization period is calculated as follows:

$$Zx'=Zx\pm Zsp/\text{vertical synchronization frequency} \quad (7)$$

Here, pps is the unit of rotational speed of a stepping motor, and represents the number of steps taken per second (1 step=1 pulse). In addition, with respect to the sign in Equation (7), + represents the moving direction of the zoom lens toward the telephoto end, and − represents the moving direction of the zoom lens toward the wide-angle end.

Next, the zoom area v' where Zx' is included is determined in Step 403. In Step 403, a process similar to that of FIG. 8 is performed by substituting Zx and v in FIG. 8 by Zx' and v', respectively.

Next, in Step 404, it is determined whether or not the zoom-lens position Zx' after the vertical synchronization period is on the boundary of the zoom area. If the boundary flag=0, the zoom-lens position Zx' is not on the boundary and the process proceeds to Step 405. In Step 405, Z(v') is set to Zk and Z(v'−1) is set to Zk−1.

Next, in Step 406, four table data items A(γ, v'−1), A(γ, v'), A(γ+1, v'−1), A(γ+1, v') corresponding to the object distance γ determined by the process shown in FIG. 7 are read out. Then, in Step 407, ax' and bx' are calculated from Equations (2) and (3). If the result is 'Yes' in Step 404, the process proceeds to Step 408, and the in-focus position A(γ, v') of the focusing lens unit 105 for the object distance γ and the zoom area v' and the in-focus position A(γ+1, v') for the object distance γ+1 and the zoom area v' are read out and memorized as ax' and bx', respectively.

Then, in Step 409, the in-focus position (target position) px' to which the focusing lens unit 105 is to be moved when the zoom lens reaches the position Zx' is calculated. The target position px' to which the focusing lens unit 105 is to be moved after the vertical synchronization period is calculated using Equation (1) as follows:

$$p_x'=(b_x'-a_x')\times\alpha/\beta+a_x' \quad (8)$$

Accordingly, the difference ΔF between the target position and the current focusing-lens position is obtained as follows:

$$\Delta F=(b_x'-a_x)\times\alpha/\beta+a_x'-p_x$$

Next, in Step 410, the standard moving speed Vf0 of the focusing lens is calculated. Vf0 is calculated by dividing the displacement ΔF of the focusing lens by the time required for the zoom lens unit 102 to move the corresponding distance.

Then, the process proceeds to Step 706 of FIG. 9. If the zooming operation is performed, the compensating operation is performed by moving the focusing lens 105 at the focus speed determined in Step 410 in the direction of the focus speed (the direction toward the close-up end is positive, and the direction toward the infinity end is negative).

Due to the above-described processes, even when super-high-speed zooming is performed in which the trajectory-tracing performance of the focusing lens unit 105 relative to the zoom lens unit 102 cannot be ensured with the signal detection period of TV-AF or when the distance to the main object varies during zooming due to camerawork or the like, trajectory tracing of the focusing lens unit 105 can be reliably performed and image blurring can be suppressed. In the present embodiment, the process of calculating the zoom-lens position after the vertical synchronization period and the in-focus position (target position) to which the focusing lens unit 105 to be moved when the zoom lens unit reaches the zoom-lens position is repeated once every vertical synchronization period to perform cam-curve tracking. However, this period is not limited to the vertical synchronization period, and the target position to be calculated may be the position after any predetermined time in the flowchart of the present embodiment. In addition, although it is described above that the distance information is obtained from the object-distance detector circuit 127 at the vertical synchronization period, the present invention is also not limited to this.

In addition, it is not necessary that the calculation period of the target positions of the lens units be the same as the detection period of the object distance. However, in the case in which the cam trajectory to be traced must be changed immediately if the main object is changed due to camerawork or the like in the zooming operation and the distance information is changed accordingly, the following expression is preferably satisfied:

Object-Distance–Detection Period (sec)≦Target-Position–Calculation Period (sec)

In the present invention, each time the distance information is detected at the object-distance-detection period, the camera microcomputer 116 selects a cam trajectory to be traced from among the countless cam trajectories shown in FIG. 11 (including cam trajectories which are not drawn in the figure but existing between the lines) as a curved line which continues from the wide angle end to the telephoto end. The calculation period of the target position (point) on the curved line may be optimally determined depending on whether the curve is to be traced as finely as possible or the microcomputer capacity and the load on the microcomputer are to be reduced by somewhat approximating the curve by a line without causing unacceptable image blurring. Thus, the position of the zoom lens unit 102 and the in-focus position (target position) of the focusing lens unit 105 corresponding to the point on the curve are calculated at the determined calculation period.

Second Embodiment

Figure 3:
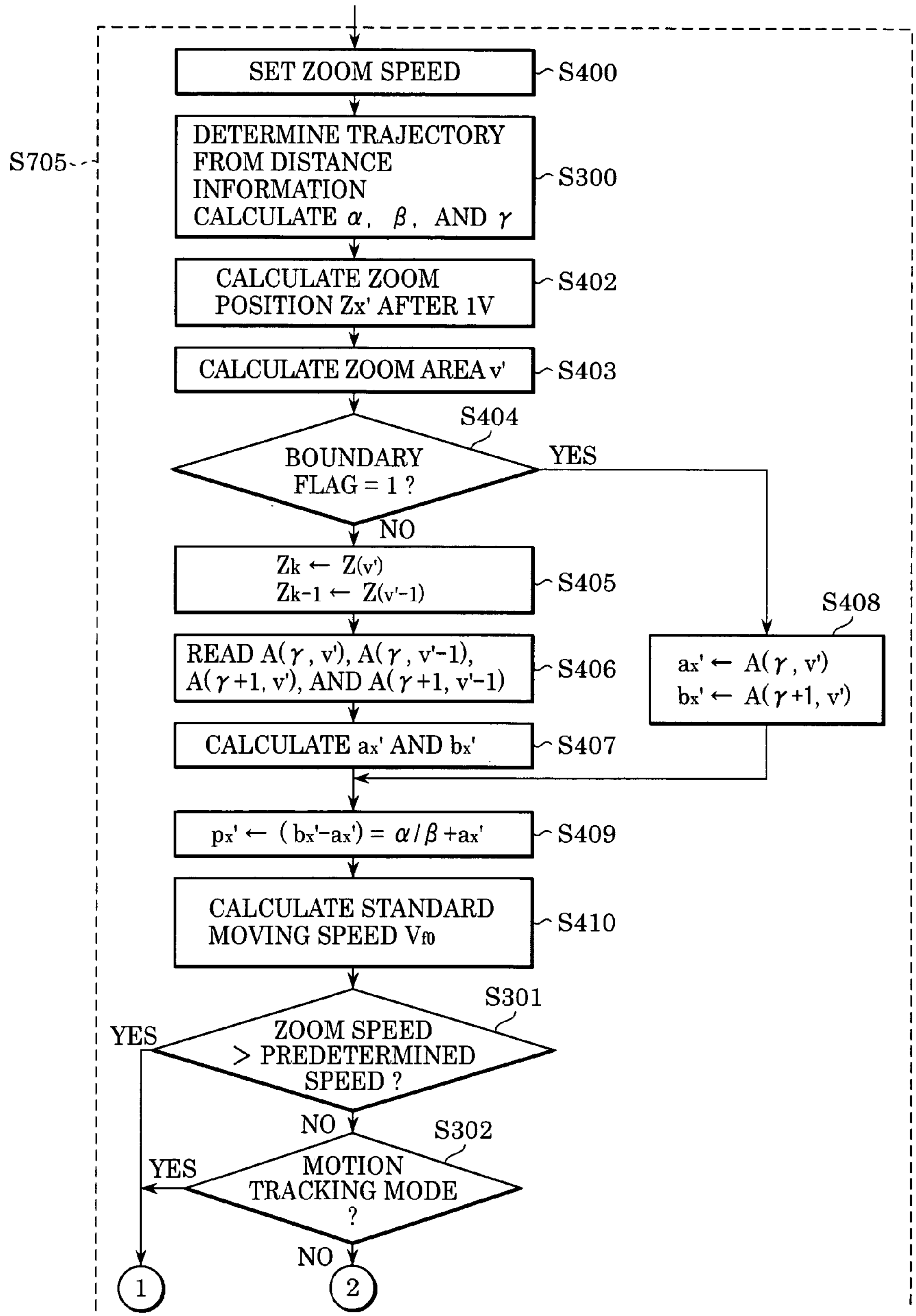
FIG. 3 is a flowchart showing an operation of a video camera according to a second embodiment.

FIG. 3 is a flowchart for explaining the operation of a video camera according to a second embodiment of the present invention. In the above-described first embodiment, the trajectory to be traced by the focusing lens unit 105 is determined (the target position is calculated) only on the basis of the output signal from the object-distance detector circuit 127. In comparison, in the present embodiment, a reference in-focus trajectory is determined using the distance information, and the in-focus position is confirmed by the zigzag movement (driving-condition switching) using the TV-AF signal (AF evaluation signal), so that the trajectory-tracing performance is improved.

In addition, in the shooting scene where the detection accuracy of the TV-AF signal is degraded, the shooting conditions are checked the process of correcting the trajectory tracing using the TV-AF signal is limited (restricted) so as to prevent accidental image blurring.

Figure 4:
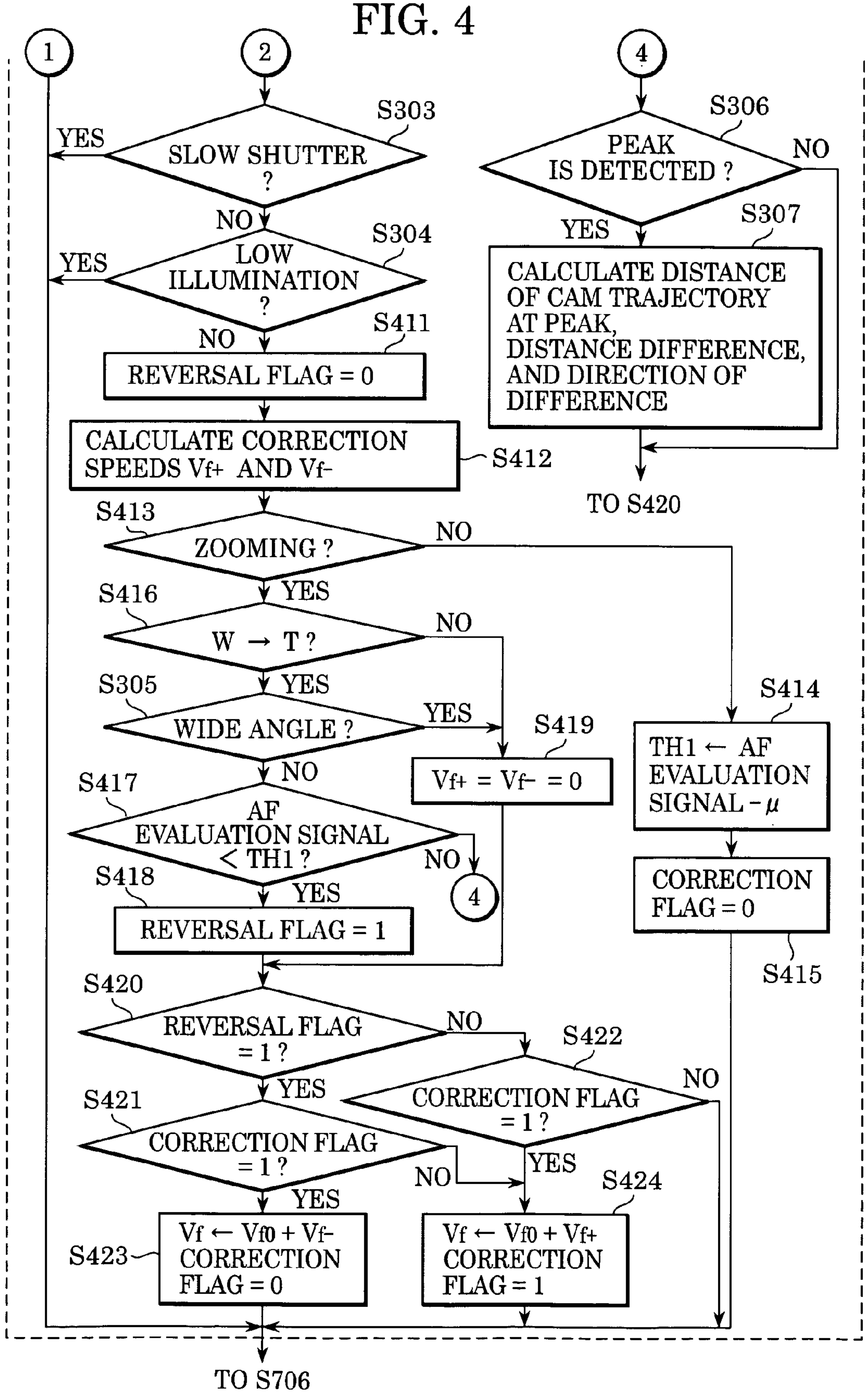
FIG. 4 is another flowchart showing the operation of the video camera according to the second embodiment.

In the present embodiment, a process shown in FIGS. 3 and 4 corresponds to the zooming process performed in Step 705 of FIG. 9. Steps similar to those in FIG. 2 or FIGS. 5 and 6 are denoted by the same reference numerals, and explanations thereof are thus omitted.

Step 400 and Steps 402 to 410 are similar to those in the first embodiment shown in FIG. 2.

Step 300 is similar Step 201 of FIG. 2, and the distance-information processor 128 performs the cam-trajectory determining process using the output signal from the object-distance detector circuit 127. In Step 201, the cam trajectory parameters are determined only on the basis of the information from the object-distance detector circuit 127. In comparison, in Step 300, if precise distance information is obtained by the cam-trajectory-correcting process using the TV-AF signal, the difference from the distance information from the object-distance detector circuit 127 is added so that the cam trajectory parameters are calculated more accurately. More specifically, the distance-information processor 128 performs the above-described first to third processes, and a more accurate object distance is determined on the basis of the result of these processes. Then, the determined object distance is translated into the trajectory parameters. The lens-unit positions used in the first and third processes are not the current lens-unit positions during the zigzag movement, but are the current lens-unit positions in Step 307, which will be described below. In addition, the third process of determining the distance difference and the direction thereof is performed in Step 307. In Step 300, the distance information from the object-distance detector circuit 127 is corrected by adding or subtracting the distance difference determined in Step 307 depending on the direction of the distance difference, and the trajectory parameters α, β, and γ for the corrected distance information are calculated.

In Step 301, it is determined whether or not super-high-speed zooming is performed in which the zoom speed is more than a predetermined speed. If super-high-speed zooming is performed, the process proceeds to Step 706 of FIG. 9, similar to the first embodiment. If super-high-speed zooming is not performed, the process proceeds to Step 302, and the mode selected by the menu switch unit 135 is checked to determine whether or not the user is selecting the shooting mode where TV-AF is not used.

For example, when a sports mode is selected for shooting an object which moves fast, the distance to the main object changes momentarily even when super-high-speed zooming is not performed. Therefore, the trajectory to be traced is determined (target position is calculated) only on the basis of the object-distance information during zooming, so that image blurring is suppressed and the disadvantages of TV-AF are eliminated. In such a case, this process is finished without performing the re-determination of the trajectory to be traced (that is, the zigzag movement) using the AF evaluation signal, which will be described below.

In addition, also when the timing generator 132 is controlled such that slow shutter is selected and the detection period of the AF evaluation value is long (Step 303), higher tracing performance is obtained when the trajectory to be traced is determined only on the basis of the object-distance information without referring to the AF evaluation signal. Therefore, the process proceeds to Step 706 of FIG. 9 without performing the following steps. Similarly, also when the S/N ratio of the AF evaluation value is low due to low illumination (when the AGC amplifier 107 is set to MAX) or when the contrast of the object is low due to darkness and the AF evaluation value obtained in the focused state does not largely differ from that obtained when the image is out of focus (Step 304), the process proceeds to Step 706 of FIG. 9 without performing the following steps for a similar reason.

In Step 411, various parameters are initialized. In addition, a reversal flag used in the following steps is cleared.

In Step 412, the correction speeds Vf+ and Vf− for the zigzag movement are calculated from the focus standard moving speed Vf0 obtained in Step 410. The correction parameter δ and the correction speeds Vf+ and Vf− are calculated by the method described above in the technical premise with reference to FIG. 16.

In Step 413, it is determined whether or not zooming is performed on the basis of the information showing the operational state of the zoom switch 130 obtained in Step 703 of FIG. 9. When zooming is performed, the process proceeds to Step 416. When zooming is not performed, the process proceeds to Step 414, and TH1 is set to a value obtained by subtracting a predetermined constant $\mu$ from the current AF evaluation signal level. TH1 is the AF evaluation signal level used as the criterion for switching the correcting-direction vector for the focus standard moving speed Vf0 (the switching criterion for the zigzag movement). Then, the correction flag is cleared in Step 415 and the process is finished.

If it is determined that zooming is performed in Step 413, it is determined whether or not the zooming direction is from wide angle to telephoto in Step 416. If the zooming direction is from telephoto to wide angle, Vf+ and Vf− are both set to 0 and the process proceeds to Step 420, so that the zigzag movement is not performed in practice. If it is determined that the zooming direction is from wide angle to telephoto in Step 416, it is determined whether or not the current zoom-lens position is closer to the wide-angle end than a predetermined focal length in Step 305.

If the zoom-lens position is closer to the wide-angle end than the predetermined focal length, the gaps between the trajectories shown in FIG. 11 are small and the focused state is obtained at substantially the same focusing-lens position for object distances in the range of several tens of centimeters to infinity. Accordingly, there is a risk that the zigzag movement using TV-AF will cause image blurring, and therefore the zigzag movement is restricted by setting Vf+ and Vf− to 0 in Step 419.

If the zoom-lens position is closer to the telephoto end than the predetermined focal length, it is determined that the zigzag movement is to be performed. First, it is determined whether or not the current AF evaluation signal level is less than TH1 in Step 417. If the current AF evaluation signal level is TH1 or more, the process proceeds to Step 306. During the zigzag movement, the AF evaluation signal reaches the peak level 1301 shown in FIG. 15 at some points. Accordingly, it is determined whether the peak level 1301 is detected in Step 306, and the process proceeds to Step 307 if the peak level is detected. In Step 307, the distance-information processor 128 determines the object-distance information corresponding to the current lens-unit positions and calculates the difference from the current distance information obtained by the distance detector circuit 127 and the direction of the difference. The object distance determined by the zigzag movement is updated each time the peak is detected, and the distance difference and the direction thereof are also updated at the same time. The re-determined cam trajectory (object distance), the distance difference, and the direction of the distance difference updated in Step 307 are used for correcting the object distance obtained by the object-distance detector circuit 127 once every vertical synchronization period. More specifically, the object distance obtained by the object-distance detector circuit 127 is corrected by adding or subtracting the distance difference depending on the direction of the distance difference, and the trajectory parameters of the cam trajectory to be traced are calculated on the basis of the corrected distance in Step 300. When Step 307 is finished, or when the peak level is not detected in Step 306, the process proceeds to Step 420 and the operation is continued without switching the correcting direction of the zigzag movement.

If the AF evaluation signal level is less than TH1 in Step 417, the reversal flag is set to 1 in Step 418 and the in-focus trajectory to be traced is re-determined (re-generated) while performing the zigzag movement (Steps 420 to 424).

Due to the above-described processes, when the shooting conditions are such that accurate zoom tracking cannot be performed by TV-AF, for example, when super-high-speed zooming is performed, when the S/N ratio of the AF evaluation signal is low, when the object contrast is insufficient, or when an object to be shot moves fast, trajectory tracing of the focusing lens unit 105 is performed without using TV-AF.

In other shooting conditions, the reference in-focus trajectory (target position) is determined using the object-distance information, and the focusing lens unit 105 is controlled such that it approaches the true in-focus position (in other words, the trajectory or the target position is corrected) using the AF evaluation signal. Accordingly, it is not necessary that the object-distance detector circuit 127 have high detection accuracy. Therefore, the size and cost of the object-distance detector circuit 127 can be reduced. In addition, when the combination of the in-focus trajectory determination using the distance information and the correction thereof using TV-AF is changed depending on the focal length of the optical system, accidental image blurring is prevented.

As described above, according to the above-described embodiments, even when the signal detection period at which the AF evaluation value of TV-AF is obtained is equal to the vertical synchronizing signal period, super-high-speed zooming can be performed without degrading the accuracy of determining the trajectory to be traced. Accordingly, the potential of small, inexpensive super-high-speed actuators which have recently been developed as actuators for focusing and zooming can be sufficiently exploited. In other words, zooming can be performed while maintaining the focused state even when the driving speeds of the actuators are increased to the limits. Therefore, it is not necessary to change the zoom speed in the recording mode from the zoom speed set when the angle of view is adjusted in the standby state.

In addition, the problem in that the detection period of the AF evaluation value becomes equal to the exposure period when long-time exposure, such as so-called slow shutter, is performed and trajectory-tracing performance using only the AF evaluation value is degraded accordingly can also be solved by the above-described embodiments. In particular, image blurring does not occur when the in-focus trajectory is being determined. In addition, when zooming and panning are performed simultaneously, image blurring can be corrected in a short time.

In addition, even in shooting conditions where the S/N ratio of the AF evaluation signal is low, as in the case where the contrast of the object is low or the illumination is low, the zooming operation can be performed while reliably maintaining the focused state.

In addition, in predetermined shooting modes, for example, in a shooting mode for shooting an object which moves fast, zooming is performed only on the basis of the information of the object distance. Therefore, compared to the case in which only TV-AF is used, the object-tracking performance is greatly improved.

In addition, when the trajectory to be traced is determined using the object-distance information and the true in-focus trajectory (target position) is re-determined while confirming the in-focus trajectory using the AF evaluation signal, the detection accuracy required of the distance detector is reduced. Accordingly, the size and cost of the distance detector and the imaging apparatus are reduced.

In addition, when the zoom-lens position is close to the wide-angle end where the in-focus trajectories converge, the focused state is obtained at substantially the same focusing-lens position for object distances in the range of several tens of centimeters to infinity. Accordingly, even when the distance detection accuracy is low, high trajectory-tracing performance can be obtained using only the information from the distance detector. Therefore, when re-determination of the in-focus trajectory based on the AF evaluation signal is restricted depending on the focal length of the optical system, image blurring caused when the re-determination of the in-focus trajectory using TV-AF is incorrect is prevented.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens-controlling device for controlling a first lens unit which moves for zooming and a second lens unit which moves for focusing, the lens-controlling device comprising:

a memory which stores data for obtaining target-position information representing a target position to which the second lens unit is to be moved, the target position corresponding to a position to which the first lens unit is moved from a current position;

a controller which generates the target-position information on the basis of the data stored in the memory and controls the movement of the second lens unit on the basis of position information of the first lens unit and the target-position information; and a detector which detects a distance to an object to be focused on, wherein the controller selects data items to be used from the data stored in the memory on the basis of a detection result obtained by the detector.

2. The lens-controlling device according to claim 1, wherein the data stored in the memory includes positional relationships between the first lens unit and the second lens unit for a plurality of distances to the object to be focused on.

3. The lens-controlling device according to claim 1, wherein the controller controls the movement of the second lens unit on the basis of focus information representing a focus state of an optical system including the first lens unit and the second lens unit, the focus information being obtained from a photoelectric conversion signal of an optical image formed by the optical system.

4. The lens-controlling device according to claim 3, wherein the controller changes driving conditions of the second lens unit such that the second lens unit moves to a position where the object is in focus according to the focus information during zooming.

5. The lens-controlling device according to claim 4, wherein the controller restricts the change in the driving conditions of the second lens unit when a moving speed of the first lens unit is a predetermined speed or more.

6. The lens-controlling device according to claim 4, wherein the controller restricts the change in the driving conditions of the second lens unit when a recording time of an image signal is a predetermined time or more.

7. The lens-controlling device according to claim 4, wherein the controller restricts the change in the driving conditions of the second lens unit when a brightness level of an image signal is a predetermined level or less.

8. The lens-controlling device according to claim 4, wherein the controller restricts the change in the driving conditions of the second lens unit when a recording mode of an image signal is a predetermined mode.

9. The lens-controlling device according to claim 4, wherein the controller restricts the change in the driving conditions of the second lens unit when a focal length of the optical system is a predetermined distance.

10. A method for controlling a first lens unit which moves for zooming and a second lens unit which moves for focusing, the method comprising the steps of:

storing data for obtaining target-position information representing a target position to which the second lens unit is to be moved in a memory, the target position corresponding to a position to which the first lens unit is moved from a current position;

generating the target-position information on the basis of the data stored in the memory;

controlling the movement of the second lens unit on the basis of position information of the first lens unit and the target-position information; and detecting a distance to an object to be focused on, wherein, data items to be used in the step of generating the target-position information are selected from the data stored in the memory on the basis of the distance to the object.

* * * * *